United States Patent
Chen et al.

(10) Patent No.: US 10,467,478 B2
(45) Date of Patent: Nov. 5, 2019

(54) SYSTEM AND METHOD FOR MOBILE FEEDBACK GENERATION USING VIDEO PROCESSING AND OBJECT TRACKING

(71) Applicant: INFINITY CUBE LIMITED, Causeway Bay (HK)

(72) Inventors: Kin Yu Ernest Chen, Hong Kong (HK); Geok Hong Victor Tan, Hong Kong (HK); Lik Fai Alex Cheung, Hong Kong (HK)

(73) Assignee: Infinity Cube Limited, Causway Bay (HK)

(*) Notice: Subject to any disclaimer, the term of this patent is extended or adjusted under 35 U.S.C. 154(b) by 236 days.

(21) Appl. No.: 15/481,395

(22) Filed: Apr. 6, 2017

(65) Prior Publication Data

US 2017/0213087 A1     Jul. 27, 2017

Related U.S. Application Data

(63) Continuation of application No. PCT/IB2016/001885, filed on Dec. 16, 2016.
(Continued)

(51) Int. Cl.
*G06K 9/00* (2006.01)
*G06T 7/246* (2017.01)
(Continued)

(52) U.S. Cl.
CPC .......... *G06K 9/00724* (2013.01); *G06T 7/248* (2017.01); *G06T 7/70* (2017.01);
(Continued)

(58) Field of Classification Search
CPC ........ G06K 9/00724; G06T 7/248; G06T 7/70
See application file for complete search history.

(56) References Cited

U.S. PATENT DOCUMENTS

| | | | | |
|---|---|---|---|---|
| 7,515,735 | B2* | 4/2009 | Miyamori | G06T 7/20 382/103 |
| 7,590,286 | B2* | 9/2009 | Miyamori | G06K 9/00335 348/169 |

(Continued)

FOREIGN PATENT DOCUMENTS

CN     101815227 A     8/2010

OTHER PUBLICATIONS

Brezak, Misel "Robust and accurate global vision system for real time tracking of multiple mobile robots" Rorbitcs and Autonomous Systems. (Year: 2008).*

(Continued)

*Primary Examiner* — Kim Y Vu
*Assistant Examiner* — Molly Delaney
(74) *Attorney, Agent, or Firm* — Mintz Levin Cohn Ferries Glovsky and Popeo, P.C.

(57) ABSTRACT

A method includes generating, with a mobile device having a camera, images of a portion of a real space containing an object having a position. The control device tracks the position of the object based at least on the images received from the mobile device. The control device monitors the position of the object for an event conforming to a rule specified at the control device. The event is based on the rule and the position of the object in the real space. The control device, or a client device, generates an indication that the event has been detected by the control device.

19 Claims, 30 Drawing Sheets

Related U.S. Application Data

(60) Provisional application No. 62/268,887, filed on Dec. 17, 2015.

(51) Int. Cl.
*G06T 7/70* (2017.01)
*H04M 1/725* (2006.01)

(52) U.S. Cl.
CPC .............. *G06K 2009/00738* (2013.01); *G06T 2207/30224* (2013.01); *H04M 1/725* (2013.01)

(56) References Cited

U.S. PATENT DOCUMENTS

| | | | | |
|---|---|---|---|---|
| 8,189,857 B2* | 5/2012 | Johnson | ............ | A63B 71/0605 382/100 |
| 8,300,935 B2* | 10/2012 | Distante | ............ | A63B 24/0021 382/103 |
| 9,036,864 B2* | 5/2015 | Johnson | ............ | G06T 7/20 382/103 |
| 9,734,405 B2* | 8/2017 | Marty | ............ | G06T 7/50 |
| 9,999,825 B2* | 6/2018 | Shachar | ............ | G06T 7/20 |
| 2003/0033318 A1 | 2/2003 | Carlbom et al. | | |
| 2007/0064975 A1 | 3/2007 | Takanohashi et al. | | |
| 2008/0200287 A1 | 8/2008 | Marty et al. | | |
| 2009/0067670 A1 | 3/2009 | Johnson et al. | | |
| 2011/0305369 A1 | 12/2011 | Bentley et al. | | |
| 2012/0293548 A1* | 11/2012 | Perez | ............ | G06F 3/012 345/633 |
| 2015/0018990 A1* | 1/2015 | Shachar | ............ | G06T 7/20 700/91 |
| 2016/0212385 A1* | 7/2016 | Ginsberg | ............ | G06T 7/73 |
| 2017/0238055 A1* | 8/2017 | Chang | ............ | H04N 13/204 725/19 |

OTHER PUBLICATIONS

International Search Report issued in International Patent Application No. PCT/IB2016/001885, dated Apr. 19, 2017 (Apr. 19, 2017). 4 pages.

* cited by examiner

SYSTEM AND METHOD FOR MOBILE FEEDBACK GENERATION USING VIDEO PROCESSING AND OBJECT TRACKING

CROSS-REFERENCE TO RELATED APPLICATIONS

The current application is related to/claims priority under 35 U.S.C. § 120 to PCT/IB2016/001885, filed Dec. 16, 2016 and entitled "System And Method For Mobile Feedback Generation Using Video Processing And Object Tracking," which claims priority under PCT Article 8(1) to U.S. Provisional Patent Application No. 62/268,887 filed Dec. 17, 2015 and entitled "System And Method For Mobile Feedback Generation Using Video Processing And Object Tracking," the contents of each are hereby incorporated by reference in their entirety.

TECHNICAL FIELD

The subject matter described herein relates to tracking and recording of object motion. Specifically, the use of a mobile device for tracking objects and providing visualizations and analytics relating to the tracked object.

BACKGROUND

In competitive sports, players and/or judges must sometimes determine where a ball was relative to a boundary line or other location at a particular time. For example, in tennis, whether a ball is in or out of bounds is a crucial part of the game. When the ball is at or near a boundary line, it can be challenging to make an accurate determination of the ball position, especially for recreational games that are not being televised. Because of human error or the difficulty in observing a fast-moving ball, having an automated system for video playback and analysis for recreational players can augment the decision making involved in the determination of a ball's status.

SUMMARY

In one aspect, a method includes generating, with a mobile device having a camera, images of a portion of a real space containing an object having a position. The control device tracks the position of the object based at least on the images received from the mobile device. The control device monitors the position of the object for an event conforming to a rule. The event is based on the rule and the position of the object in the real space. The control device, or a client device, generates an indication that the event has been detected by the control device.

In some variations one or more of the following features can optionally be included in any feasible combination.

The tracking can also include identifying the object in the plurality of images based at least on a property of the object as it appears in the plurality of images. Image coordinates of the object in the images can be mapped to real coordinates of the object in the real space. A trajectory of the object based at least on the real coordinates can be calculated. An event position of the object can be determined based at least on the calculated trajectory. The event position can correspond to the position of the object required to apply the rule for determining the occurrence of the event.

The object can be a ball and the event position can be a point of impact of the ball on a surface in the real space. The event position can be a hit position of the ball when the ball is hit by a player. The property is a size of the object in at least one of the images.

The identifying can include at least one of: applying a custom mask filter to remove a masked portion of the images to prevent the portion from being processed during the identifying, applying a noise filter that can remove an outlier real coordinate by comparing the real coordinate to an expected trajectory of the object, the trajectory based at least on the remaining real coordinates, and applying a movement filter to remove a static portion of the images, the static portion identified as regions of the images that are generally unchanging between consecutive images.

Determining the event position can include generating a score for an image from each of the mobile devices that imaged the event, the score based on factors comprising: an object area of the object, a spread of the trajectory, and a roundness of the object. The factors can be determined from the image and the image can be selected that has the highest score for determining the event position of the object.

The generating of images can be performed by a plurality of mobile devices, each of the mobile devices having a corresponding camera.

The mobile devices can be paired at the control device. The pairing can include initiating a match and generating a match identification at the control device, the mobile device, or at a remote computer. A graphical identifier can be displayed that corresponds to the match identification. The camera on the mobile device can scan the graphical identifier to associate the mobile device with the match identification. The mobile devices can listen for a command from the control device that is associated with the match identification. The command can be executed at the mobile device. The command can include transmitting at least one of the images to the control device.

A buffered image can be transmitted from the mobile device to the control device upon receipt of a transmit command at the mobile device. The buffered image can correspond to the images captured during a buffer time prior to receipt of the transmit command The buffered images can be written to a first buffer and a second buffer in an alternating manner. The alternating can switch between writing to the first buffer and the second buffer every elapsed buffer time.

A challenge request can be received at a command server from an input device or the control device. The mobile device can receive confirmation that the challenge request was received at the command server. Buffered images can be received at a processing server from the mobile device. The buffered images can be from a buffer in the mobile device. A challenge result can be displayed at the control device based on the processing server processing the challenge request with the buffered image The mobile device can be paired to the control device causing the images received from the mobile device to be associated with the match based on a match identifier and a device identifier. Commands transmitted from the control device can be executed by the mobile device when the command includes the match identifier and the device identifier.

An object speed can be calculated based on a difference between the real coordinates of the object at times when the corresponding images of the images were acquired. The object speed can be displayed at the control device.

A plurality of reference points in the real space can be imaged with the mobile device. System-generated lines, based on the plurality of reference points and a playing area configuration, can be generated and displayed at the control device.

The system-generated lines can approximate court lines imaged by the mobile device and displayed proximate to the court lines simultaneously displayed at the control device. The system-generated lines can be adjusted to be substantially overlapped with the court lines to cause the position of the object in the real space to conform to a corresponding position of the object in a virtual space defined by the system-generated lines. The adjusting can be in response to user-generated input at the control device.

A white balance of the images can be calibrated to maintain a predefined brightness of at least a portion of the images in the images. The calibrating can be dynamically performed in response to a detected change in lighting conditions in the real space.

A textual representation of statistics can be generated at a graphical user interface corresponding to the tracked motion of the object and the rule. The event can be a bounce of an object and the rule can designate whether the object is in a defined region of the real space or out of the defined region of the real space. A score displayed on a user interface can be automatically updated in response to detecting the event, wherein the event is a scoring event according to the rule.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the status of a ball can be determined utilizing images captured by the camera(s) of one or more mobile devices positioned around a playing area. The status can be based on at least a specific event, one or more pre-defined boundaries, interpolated or extrapolated ball trajectories, and one or more pre-defined rules. When implemented with a mobile device, the system can allow repositioning of the camera of the mobile device to view an arbitrary portion of the play area, depending on the location and orientation of the mobile device. The mobile device can perform analysis of events based on input at the mobile device or on received verbal user commands. In another implementation, a wearable device can be linked to the mobile device. The wearable device can transmit commands to the mobile device to provide input similar to that of commands entered by a user at the mobile device. Any of the devices described herein can be connected via radio waves, cellular signal, WiFi, Bluetooth™, or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods for object tracking and feedback generation with a mobile device, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
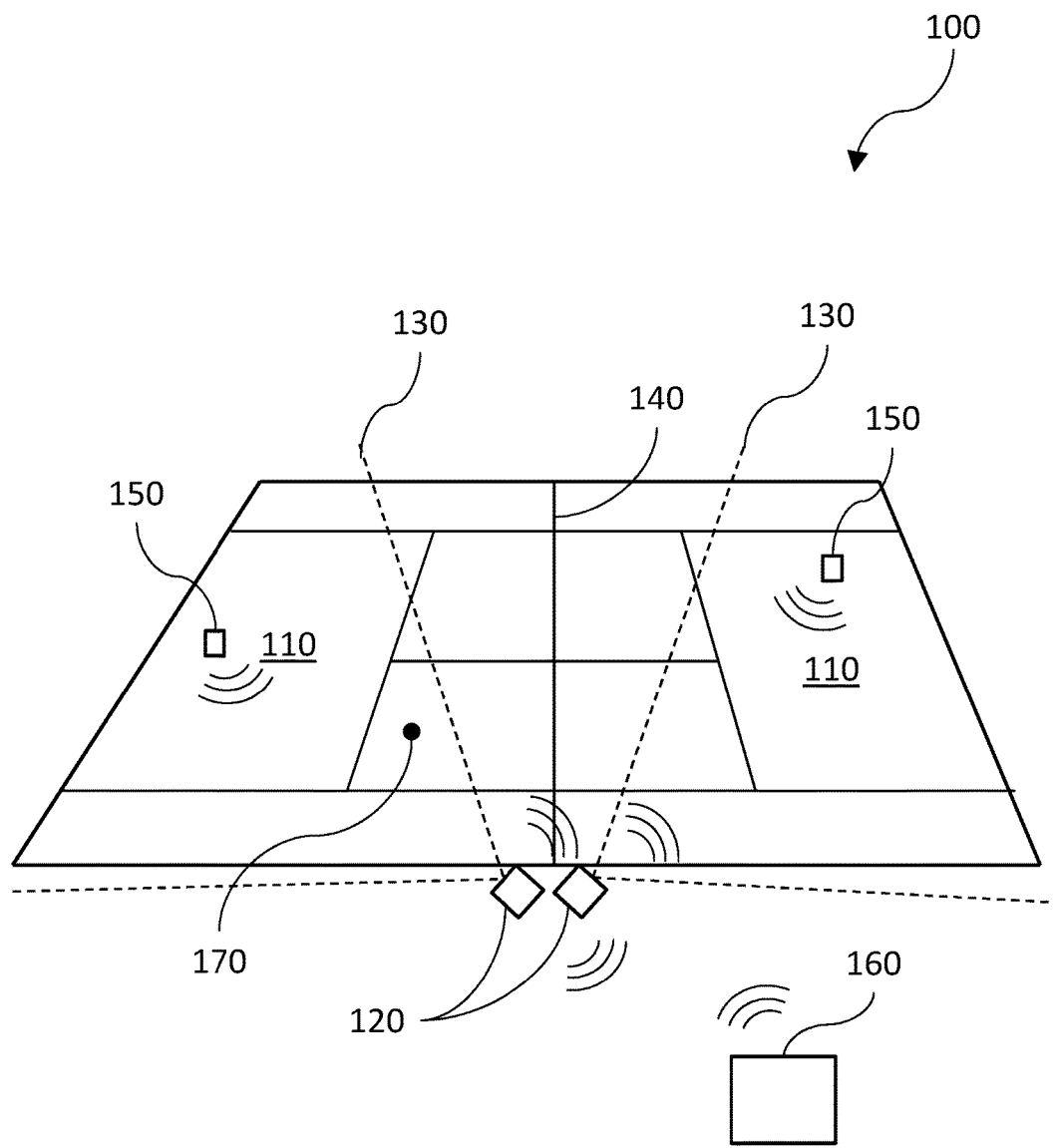
FIG. 1 is a diagram illustrating a simplified perspective view of a playing area monitored by two mobile devices each having a specified field of view of the playing area in accordance with certain aspects of the present disclosure.

The current subject matter provides a system and method for tracking, in real-time or near real-time, objects being imaged by one or more cameras viewing an area, for example a playing area for a sporting event. The cameras can be integrated into, for example, a mobile device such as a smartphone. Accordingly, some methods can include positioning the mobile devices such that their cameras view a portion of the playing area. As part of a setup routine, or at any other time, the system or a user can provide commands to the mobile device to define a virtual area or other boundaries within the virtual area that conforms to the imaged real area. Once defined, the cameras can track the motion of players, balls, or other objects in the virtual area. In the context of using the systems and methods described herein with a sporting event, the area can be a playing area where the sporting event is taking place.

In addition, in some implementations, one or more users, players for example, can have wearable devices that are linked with the mobile device to provide commands or receive output. Wearable devices, as used herein, can include smartwatches, wrist/arm keyboards, smart eyewear, or the like.

As desired, a user can send a command, for example by voice or from a wearable device, to the mobile device to challenge or analyze a particular event, for example, a ball going out of bounds, the motion of a player, scoring a point, or the like. One of the mobile devices, or any connected computing device, can provide a graphical display, or other feedback related to the event, to the user. The system can also provide record-keeping and analytics related to the recorded events, for example, keeping score, successful completion of specified player tasks/actions, improvement over time, or the like.

The features described herein can be implemented as a mobile application or any distributed computer program. As used herein, the computer code responsible will can be referred to as an "application" or "app," though the software responsible for the functions described herein can be any sort of computer program and not limited to a mobile application.

As used herein, the description of many features are made in relation to the game of tennis. Such an example implementation is not intended to be limiting. For example, the features described herein can be applied to any suitable game or activity, for example, football, hockey, baseball, basketball, track and field sports, soccer, or the like. Also, while the type of object most commonly tracked is a ball, this too is not limiting. For example, a person, vehicle, or any sort of moving object can be tracked in a similar manner.

As used herein, the term "mobile device" can include, for example, a mobile telephone, a smartphone, a tablet computer, a laptop computer, or similar such devices that incorporate or connect to a camera. Also, cameras can be integrated into the mobile devices, or can be stand-alone cameras located about a playing area. Any cameras can be connected wired or wirelessly to any of the computing systems described herein in order to enable the described features.

Input devices, as used herein, can include, for example, the mobile device, the wearable device, a smartphone, tablet computers, desktop computers, or the like. Graphical output relating to the execution of the operations described herein can be displayed on a graphical user interface, a web browser, audio output, or the like. In one embodiment, a camera can be integrated in a first smartphone and output to a second smartphone or wearable device. Data from one or more or all deployed cameras/smartphones can also be transmitted to a control device, such as a smartphone or tablet that consolidates all output, feedback or analytics—this is useful for an umpire or referee to oversee a sports activity, or a coach who is monitoring the training of a user or anyone in the audience who is monitoring the match.

Therefore, as described herein, a mobile device with a camera can generate images of a portion of a real space containing an object having a position. The images can be, for example, a sequence of still images, either individually or in the form of a video or movie file. The real space can conform to the playing area, or portion thereof, that is imaged by the camera. The object can be, for example, a ball, player, or piece of player equipment such as a racquet, glove, helmet, or the like.

The position of the object can be tracked at the control device based at least on the images received from the mobile device. The position of the object can be monitored at the control device to determine when a specified event occurs. Events can include, for example, whether a ball is "in" or "out" of a defined boundary, whether a ball touched an object, for example a net, whether a ball was served, returned, caught, or the like. The event can conform to a rule, which may or may not be specified at the control device. For example, a rule can be that a ball is "in" if it impacts the playing area on one side of a line and "out" if it impacts the playing area on the other side of the line. The event (e.g. in or out) is based on the rule and the position of the object in the real space. Once the event has been detected or determined to have occurred, the control device, a processing server, or other designated computer, can generate an indication at the control device or at a client device, an indication that the event has been detected by the control device. The client device can include any of the mobile devices, web clients, browsers, video displays, the control device, or the like.

FIG. 1 illustrates a simplified perspective view of a playing area 110 monitored by two mobile devices 120 each having a specified field of view 130 of the playing area 110 in accordance with certain aspects of the present disclosure. In some implementations, one or more mobile device s 120 can be positioned to view part of a playing area 110. In the example shown in FIG. 1, the mobile device s 120, specifically their integrated cameras, each have a field of view 130 of a portion of the playing area 110 as shown by the dashed lines. The total field of view 130, taken to be the sum of all the fields of view 130 of the mobile devices 120, can result in overlapping fields of view or result in regions where there is no coverage. As shown in FIG. 1, the region around the net 140 is not imaged by either of the two mobile device s 120. Any number of mobile device s 120 can be positioned to view the playing area 110 in any desired configuration. The system can combine the images acquired by the mobile device s 120 to track the desired objects 170 as described in greater detail below.

Also, as described in further detail below, the system can include one or more input devices 150, which can include, for example, wearable devices such as a smartwatch, smartglasses, or the like. The input devices 150, for example, when worn or used by a player, can be in communication with the mobile devices 120 to issue commands or receive data from the mobile device s 120 or a remote computer over a wireless connection. In some implementations, a smartphone or any sort of mobile device 120 can be configured to provide data and commands to a control device 160, the mobile device s 120, or any other computing system in a manner similar to the wearable device 150.

A control device 160, for example a laptop computer, tablet, smartphone, or the like, can be in communication with the mobile devices 120 and any other input devices 150. The control device 160 can be used by a referee to officiate the match, initiate challenges that can be resolved by the system, view, maintain, or update scores, send video to other computers when desired, transmit images to social media sites, or the like as described herein.

The mobile devices 120 can track, players, objects 170 (e.g. balls), or the like. In the example shown in FIG. 1, an object 170 can be imaged by the leftmost mobile device 120. The object 170 cannot be currently imaged by the rightmost mobile device 120 as the object 170 is outside the field of view 130 of the rightmost mobile device 120. Depending on the number and orientation of mobile devices 120, the field and depth of field of cameras, the size and configuration of the playing area 110, and so on, different configurations of mobile devices 120 can provide differing and types and quality of coverage for object tracking.

Figure 2:
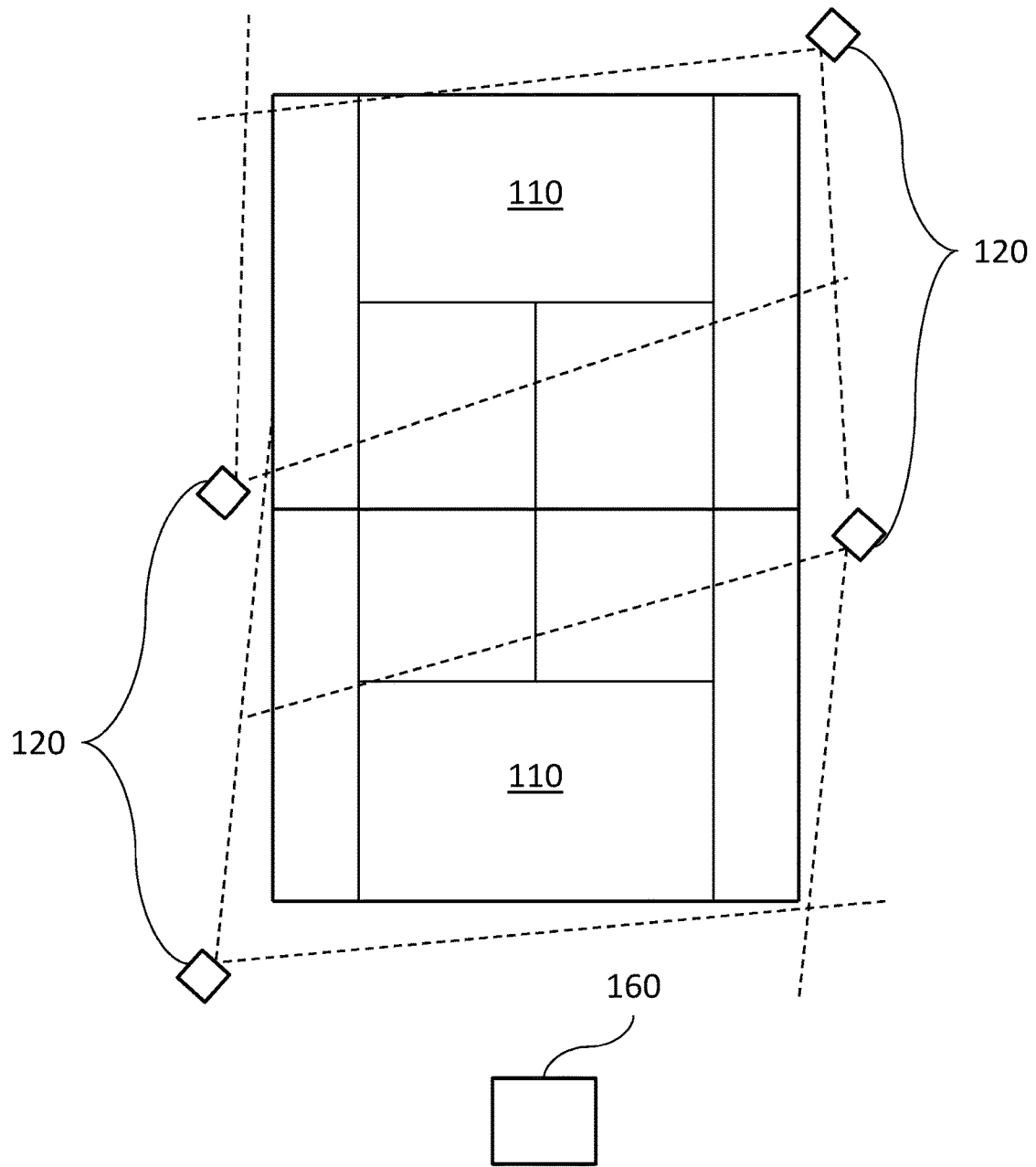
FIG. 2 is a diagram illustrating a simplified perspective view of four mobile devices imaging the playing area in a first configuration in accordance with certain aspects of the present disclosure.
Figure 3:
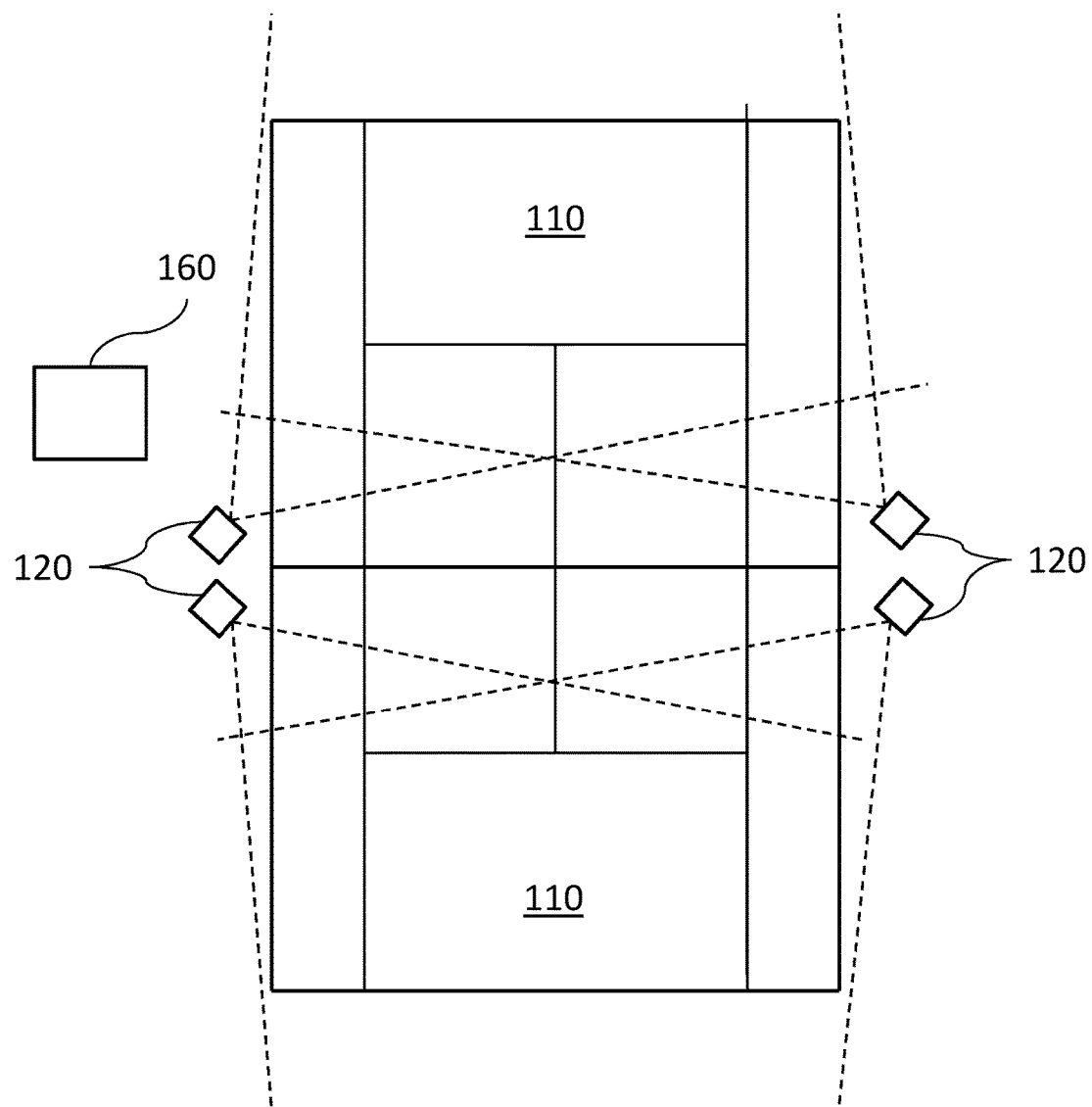
FIG. 3 is a diagram illustrating a simplified perspective view of four mobile devices imaging the playing area in a second configuration in accordance with certain aspects of the present disclosure.

FIG. 2 illustrates a simplified perspective view of four mobile devices 120 imaging the playing area 110 in a first configuration in accordance with certain aspects of the present disclosure. FIG. 3 illustrates a simplified perspective view of four mobile devices 120 imaging the playing area 110 in a second configuration in accordance with certain aspects of the present disclosure. As described herein, there can be any number of mobile device s 120 arranged about the playing area 110 to image regions of interest. The mobile device s 120 can have varying degrees of overlap of their fields of view. For example, FIG. 2 illustrates the entire playing area 110 being imaged. Some regions of the playing area 110 are imaged by one mobile device 120, while other regions are imaged by two or more mobile device s 120. FIG. 3 illustrates one example configuration where the back half of each side of the playing area 110 being imaged by strongly overlapped fields of view of the mobile device s 120.

System Setup

The user can begin the setup process for the system by, in some implementations, deciding how many mobile device s 120 to use and their placement. For a smartphone running the application described herein, the user can initiate the application on each of the desired smartphones. If the mobile device 120 used to image the playing area 110 is only a camera, then the camera can be set to begin recording and transmitting image data to the control device 160, or other receiving computer in the system. Optionally, one mobile device 120, or the control device 160, can be the 'host' and other mobile device s 120 can join in the session initiated by the host. Once joined, the images can be synchronized or paired to allow viewing of multiple areas (or multiple perspectives) of the playing area 110. As other mobile device s 120 join the system, each mobile device 120 can be updated by the control device 160 or host to include information about the setup, for example, player profiles, scores, identifying information for the player(s) and or the ball(s), or the like. Because each mobile device 120 is located at different positions about the playing area 110, features that depend on the particular field of view 130, such as image masking (described below) and can also be individually performed for each additional mobile device 120 joining the session. Upon completion of the setup, the system is ready for use by the players.

In some implementations, mobile device s 120 can be joined (or paired) into the collection of mobile device s 120 viewing the playing area 110 by pairing them with the control device 160. The pairing can include generating a match identification at the control device 160, the mobile device 120, or any other remote computer or server. A match identification can include a unique number, string, or other character sequence that uniquely specifies a particular match. The match identification can be specified by a user, or automatically generated by the system. In some implementations, each mobile device 120 can have a device identifier. Pairing can be performed by combining the device identifier with the match identification to form a combined key. By providing a unique match identifier, this can prevent signal mixing when there are multiple mobile device s 120 transmitting or receiving in proximity to each other, but used for different matches or games by different players. A graphical identifier can be displayed that corresponds to the match identification. The graphical identifier can be, for example, a bar code, QR code, a serial number, or the like. The graphical identifier can be displayed at the control device 160, any of the mobile devices 120, or any connected computer configured to display the graphical identifier. The graphical identifier can be scanned with the camera on the mobile device 120 to associate the mobile device 120 with the match identification. Scanning can include acquiring an image of the graphical identifier and analyzing the image to extract the match identifier from the image. Once associated, the mobile device 120 can listen for a command from the control device 160 that is associated with the match identification. Examples of commands can include, for example, transmit acquired image data, display a score, provide an alert, or the like. When a command related to the match is received at the mobile device 120, the mobile device 120 can execute the command, for example transmitting some of the images to the control device 160. With multiple mobile devices 120 paired, the system described herein can continue to function in the event that the mobile device 120 is removed or undergoes an unexpected device failure. The mobile device 120 can be unpaired from a match. Once unpaired, the mobile device 120 can cease listening to the command requests issued to that match. In some implementations, the mobile device 120 can delete the match identification that was previously in use. Once unpaired, a mobile device 120 can be paired to another match using the pairing process described above.

In one implementation, images or ball trajectory data can be transmitted by any of the mobile device s 120 to one or more control device 160, for example, a computer or mobile device 120 used by a referee or other official. The control device 160 can transmit data back to the mobile device s 120 to indicate a decision about a ball status, feedback on a performed player motion, or the like. The mobile device s 120 can, based on data received from the control device 160, provide one or more audio and/or visual indicators corresponding to the received data.

Upon placement of the mobile devices 120, users can initiate operation of the system by, for example, input to a wearable device or by direct commands on the interface of the mobile device 120. The system can then automatically calibrate itself to model the playing area 110 in a 3D space. The calibration can include locating the ball, the playing area 110, accounting for lighting conditions, device placement, perspective of the court, or the like.

Figure 4:
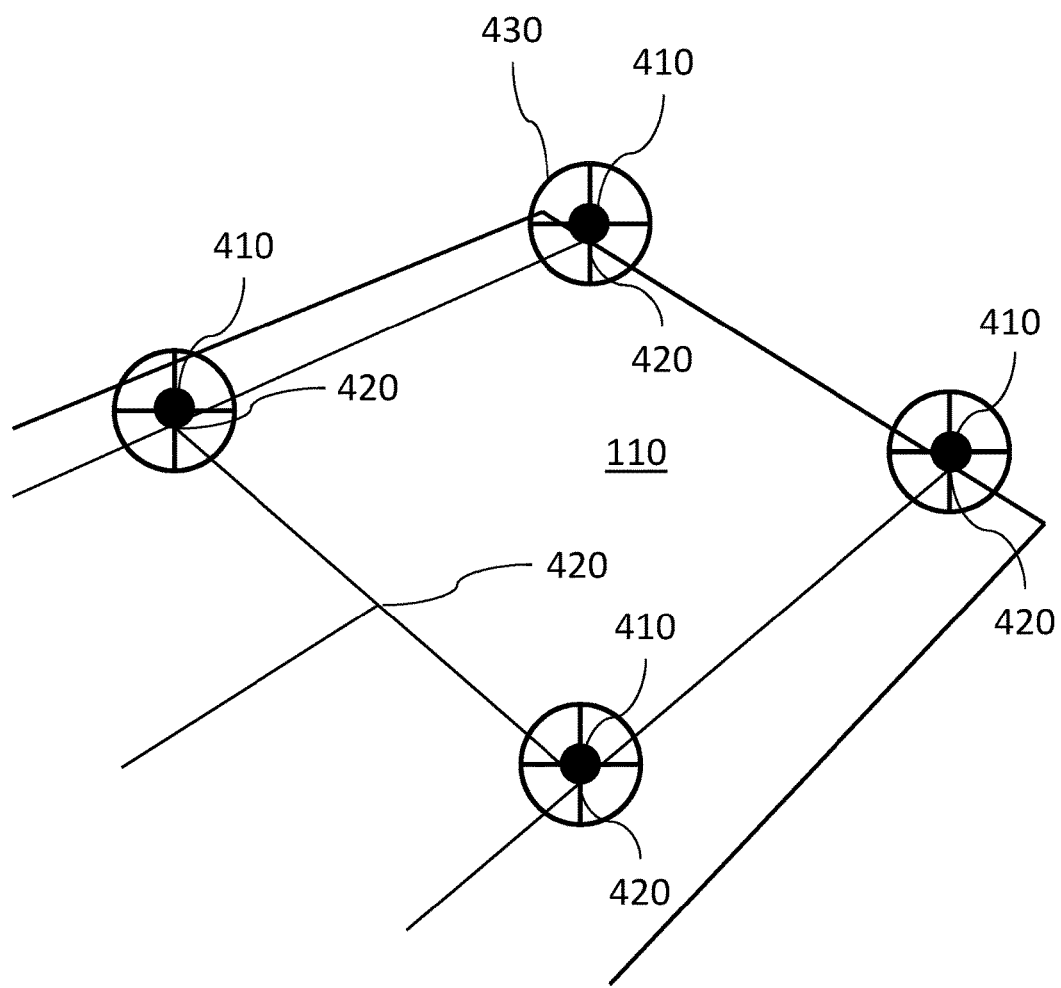
FIG. 4 is a diagram illustrating a simplified perspective view of four reference objects placed at reference points in the playing area in accordance with certain aspects of the present disclosure.

FIG. 4 illustrates a simplified perspective view of four reference objects 410 placed at reference points 420 in the playing area 110 in accordance with certain aspects of the present disclosure. Reference points 420 can include lines on the playing area 110, intersections, poles, nets, or the like. To aid in the mobile device 120 recognizing the plane of the playing area 110 or the configuration of lines on the playing area 110, an overlay of reference points 420 can be displayed on the mobile device 120. The position of one or more mobile devices 120 can be adjusted until the image of the corresponding lines matches that of the overlay. Such a feature is optional, and the positions of the mobile devices 120 do not need to correspond to positions that capture an image that matches an overlay. When referenced against known court dimensions stipulated by the rules of tennis, these markers can enable the system to determine the actual coordinates in the playing area 110. As a further aid, in some implementations, a circle or circle and cross hair 430 can be displayed and moveable to center, or approximately so, on the reference objects 410. This can provide the system with a narrower region of the imaged playing area 110 to analyze for determining the position of the reference objects 410.

Figure 5:
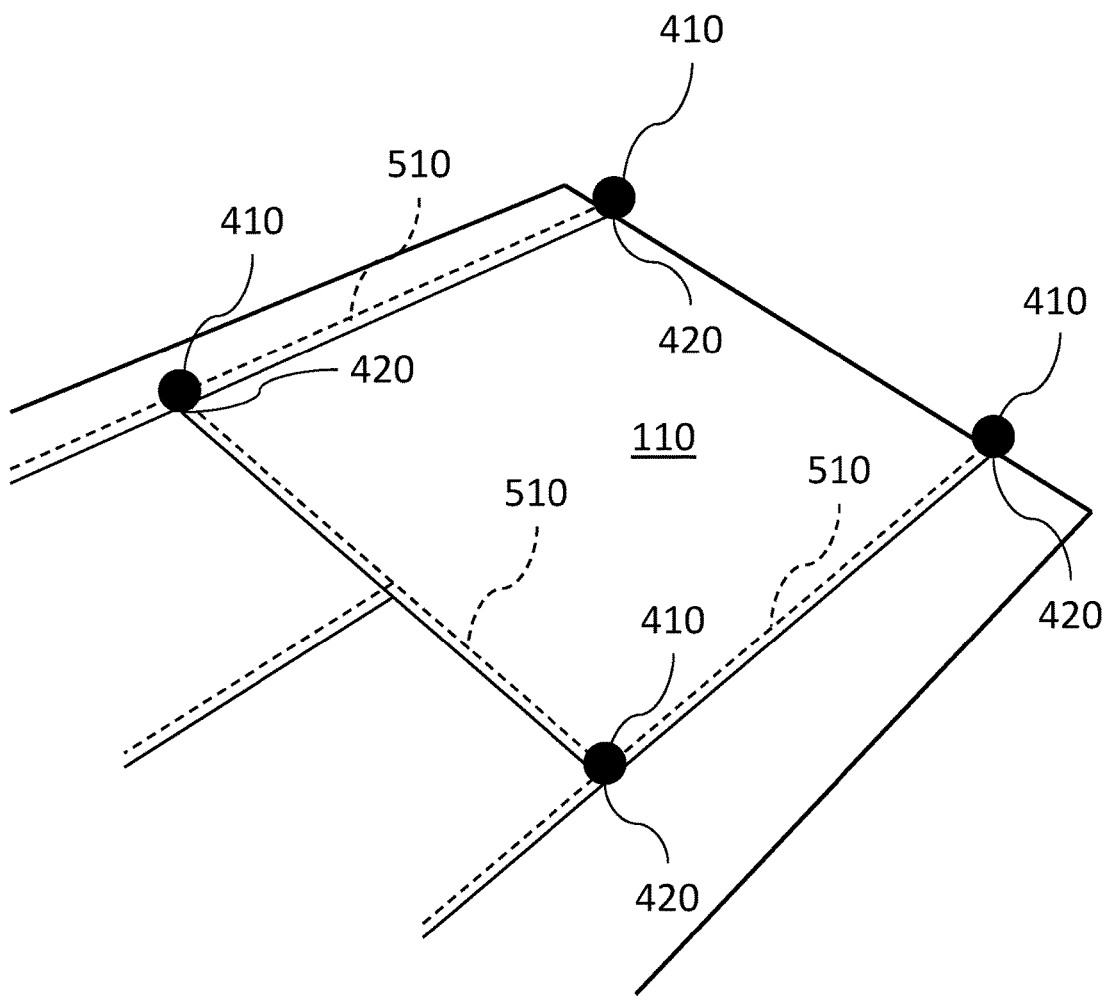
FIG. 5 is a diagram illustrating a simplified perspective view of system-generated lines in accordance with certain aspects of the present disclosure.
Figure 6:
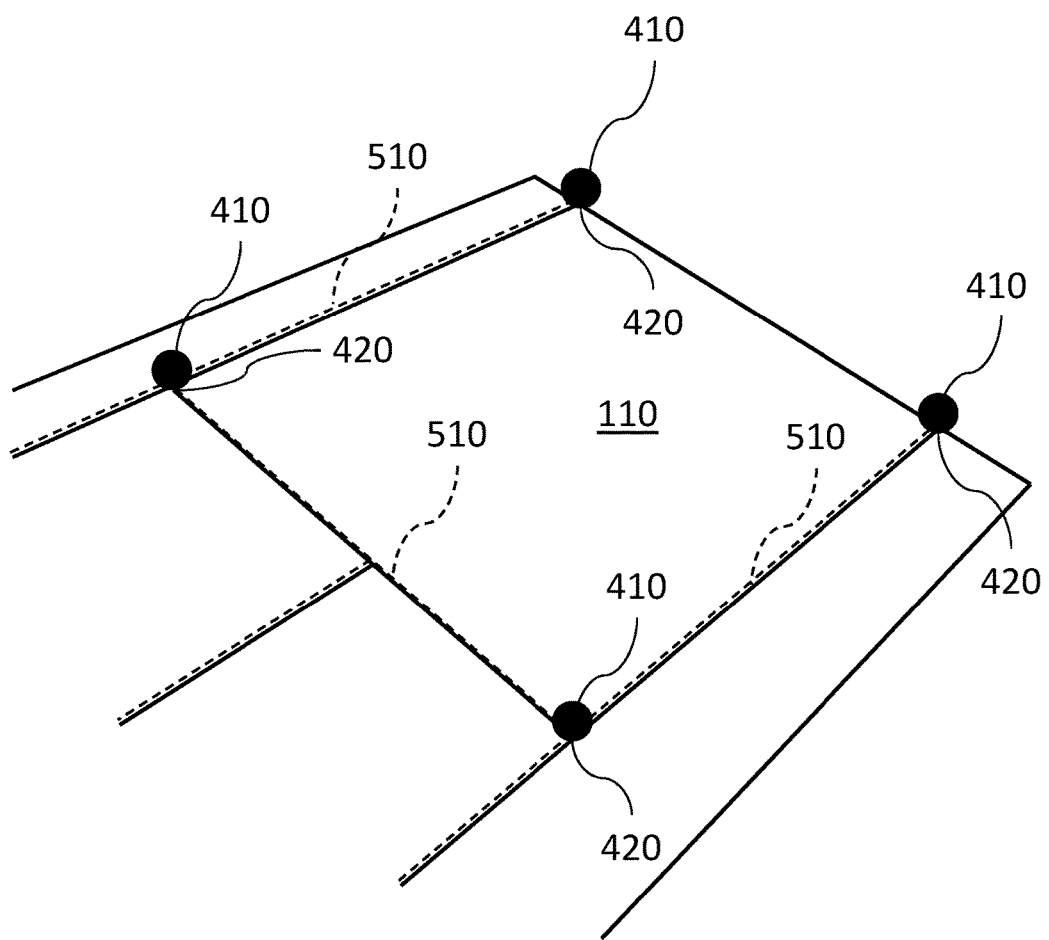
FIG. 6 is a diagram illustrating a simplified perspective view of system-generated lines overlaid with the court lines in accordance with certain aspects of the present disclosure.

FIG. 5 illustrates a simplified perspective view of system-generated lines 510 in accordance with certain aspects of the present disclosure. FIG. 6 illustrates a simplified perspective view of system-generated lines 510 overlaid with the court lines in accordance with certain aspects of the present disclosure. Once the playing area 110 is being imaged, the court lines, or other reference lines or points in the playing area 110, can be configured by overlaying or merging of system-generated lines 510 with the actual court lines. In some implementations, the system-generated lines 510 can be based on the homography matrix described herein, image recognition of the court lines directly from the images of the playing area 110, or the like. To obtain reference points for generating the system-generated lines 510, high-contrast objects 170 can be placed at specific points in the playing area 110. For example, tennis balls, which are usually bright green or yellow, can be placed and imaged in contrast with the duller background of the playing area 110. Similar to the methods described herein for object tracking, the object 170 can be recognized and identified as a reference object 170. To further aid in identifying the reference objects 410, a user can select a portion of the image that is known to contain the reference object 410 and exclude other portions. This is illustrated in FIG. 4 by the circles and cross-hairs, graphically generated at an input device 150, which can be moved by a user to approximately center on the images of the reference objects 410. Once the reference objects 410 are located by the system, the system-generated lines 510 can be generated as shown in FIG. 5 based on the reference objects 410. As the reference objects 410 define known points in a known court configuration, for example specific corners or points on tennis court lines, the system-generated lines 510 for the entire court can be created. As shown in FIG. 6, the system-generated lines 510 can be translated by the user or the system to coincide with the real court lines imaged on the computer. In FIG. 6, the system-generated lines are shown still slightly offset for illustrative purposes.

As a refinement to the above, in some cases the size of the reference object 410 can be accounted for when generating the system-generated lines 510 or overlaying the system-generated lines 510 onto the lines imaged by the mobile devices 120. For example, a common tennis ball can be about 6.6 cm in diameter. When tennis balls are used as reference objects 170, the center of the tennis ball is 3.3 cm above the actual point of reference desired. In some implementations, a vertical projection can be performed between the center of the object 170 that extends for the correct distance, based on the known or assumed size of the reference object 170. In other implementations, the contact point of the reference object 170 can be determined based on analyzing the image of the reference object 170 to determine a lowest point. The lowest point of the reference object 170 can be taken as a best match to the actual reference point 420 in the playing area 110.

The current subject matter supports a range of configurations of mobile devices 120 for capturing the motion of objects 170 of interest. Three example configurations can be a minimal configuration (not intended to imply that these are required for all setups), a basic configuration, and a full configuration (not to imply that these are the extent of connected components). The minimal configuration can include one mobile device 120 and one processing server. A processing server can be a computer that processes the images from the mobile device 120 to provide the analysis and output as described herein. The processing server can be the computer in the mobile device 120 itself, a separate computing device (such as a server or laptop), a cloud-based computing device for distributed or remote processing of data, or the like. Further details of the processing server can be found in the discussion of FIG. 24.

The basic configuration can include one or more input devices 150, two or more mobile devices 120, and one or more processing engines, such as the control device 160. FIG. 1 illustrates a basic configuration. In one implementation, there can be a side-by-side configuration with two mobile devices 120 with a 240 degree field of view 130 that results in no overlapped field of view 130, similar to that shown in FIG. 1. In another implementation, there can be an up-down configuration where the mobile devices 120 are arranged vertically, but still oriented to provide the same horizontal coverage as in FIG. 1. The mounts can include external battery packs connected to the mobile devices 120 to extend recording life. The mounts and the corresponding mobile devices 120 can be oriented in any combination of directions to provide the desired views of the playing area 110.

The full configuration can include one or more wearable devices 150, four to twelve (or more) mobile devices 120, one or more tablet devices serving as the control device 160, and one or more processing engines. The tablet devices can enable displaying output or providing remote control over the connected mobile devices 120 and/or wearable devices 150. The combined video feed from any or all mobile devices 120 can be combined or stitched together to form a synchronized record of the events that occur in the playing area 110.

Figure 7:
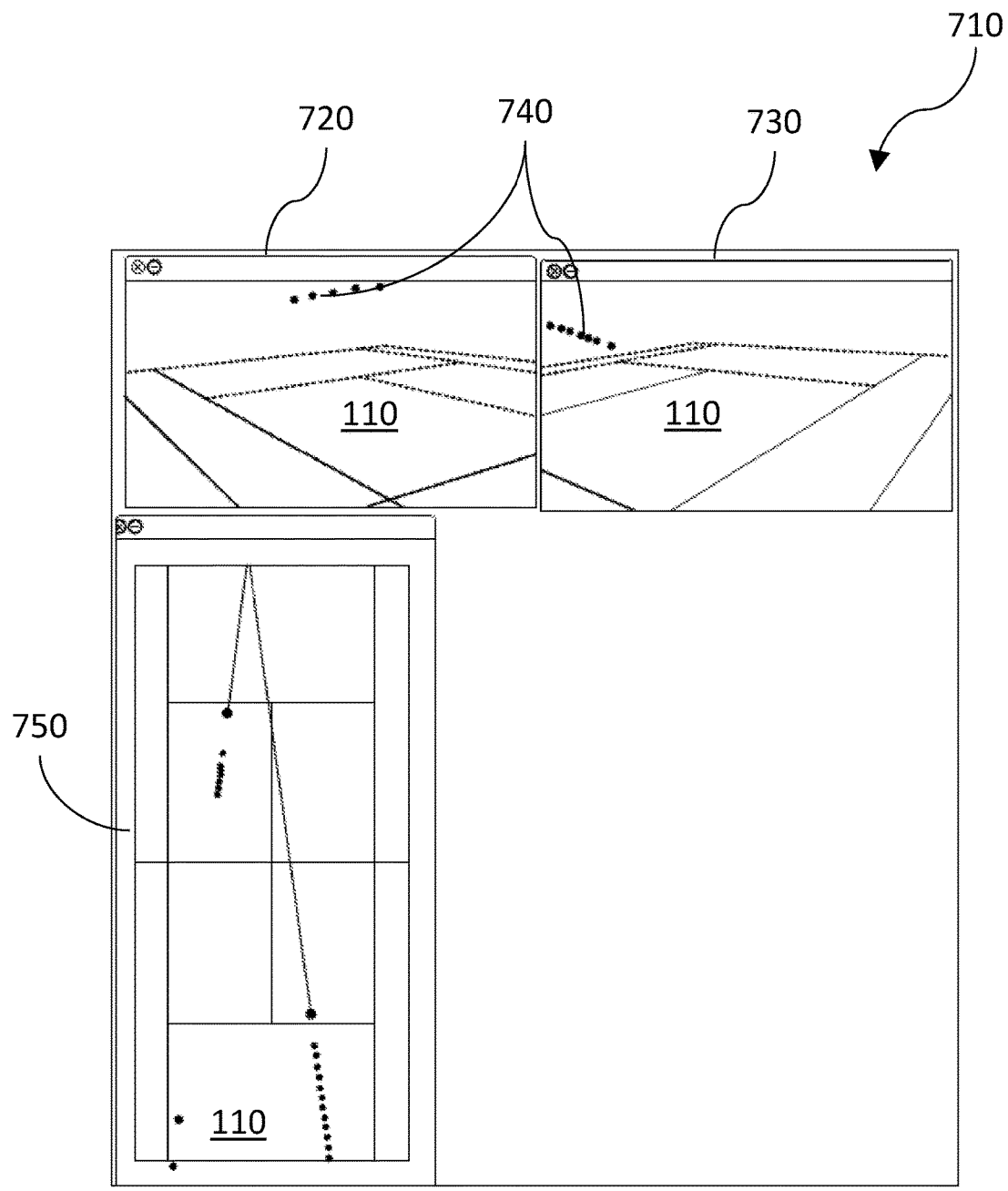
FIG. 7 is a diagram illustrating simplified views of the playing area in the virtual space in accordance with certain aspects of the present disclosure.

FIG. 7 illustrates simplified views of the playing area 110 in the virtual space 710 in accordance with certain aspects of the present disclosure. Once mobile devices 120 are positioned about the playing area 110, the acquired images can be interpreted by the application to provide a virtual space 710 that can be referenced by the application for performing object tracking. The example in FIG. 7 illustrates a first view 720 and a second view 730 from two mobile devices 120 imaging different portions of the playing area 110. Also, the trajectory 740 of a ball is shown in a top view 750 of the combined playing area 110. The combined playing area 110 can be generated by combining the playing areas 110 imaged by the two cameras and aligning them according to the reference points 420 imaged as described with reference to FIGS. 4-6.

The tracking of the object 170 can include identifying the object 170 from the images based on, for example, a property of the object 170 as it appears in the images. The image coordinates (e.g. pixel positions) of the object 170 in the images can be mapped to real coordinates of the object 170 in the real space (e.g. the playing area 110). Among other things, the tracking can enable calculating the trajectory 740 of the object 170 based on the real coordinates of the object 170 that change from image to image. Based on the trajectory, an event position can be determined for the object 170. The event position can correspond to the position of the object 170 required to apply the rule for determining the occurrence of events. Events can include scoring, whether a ball is in or out of a particular region of the playing area 110, an action taken by a player, or the like. Events are described in further detail with regard to FIG. 23. Likewise, the event position can be a point of impact of the object 170 on a surface in the playing area 110, a position of the object 170 was when it was hit by a player, or the like. The property can include, for example, a size, shape, position, velocity, roundness, color, pattern, or the like of the object 170. Determination of these properties can be performed by analyzing the images as described further herein.

Figure 8:
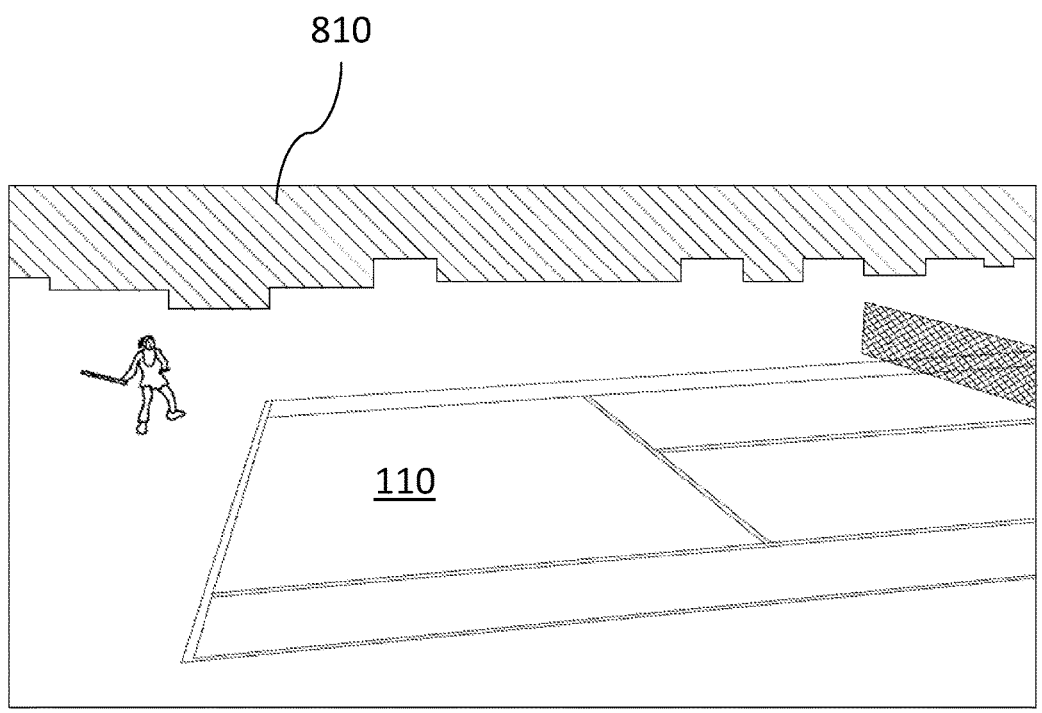
FIG. 8 is a diagram illustrating applying a custom mask filter to an image in accordance with certain aspects of the present disclosure.

FIG. 8 illustrates applying a custom mask filter to an image in accordance with certain aspects of the present disclosure. The custom mask filter can remove a masked portion 810 of the image to prevent the masked portion 810 from being processed by the application. This can improve both accuracy of object tracking as well as reducing computational cycles needed to do so. Once the mobile device(s) 120 are placed, a user can specify a portion of the imaged area to be masked. In the example shown by FIG. 8, the crowd stands have been masked out of the imaged area. This prevents the application from processing the movement of many objects 170 that are not players or the ball. As a consequence, removal of the masked portion from the image can result in a smaller image size for transmission or storage. This can speed processing and transmission of the images or video during operation of the system. The custom mask filter can be re-established in response to a change in position of the mobile device 120 or a change in the background. Each mobile device 120 used in the system can have its own custom mask filter. To define what is to be filtered out, the user can define a custom mask by drawing on a touch screen to black out the filtered region, highlighting an area on the screen, the system can perform an automatic process whereby certain images are excluded (such as people), or the like. Other methods of user input can be equivalently used to define the masked portion 810, for example, input from a stylus, keyboard, or the like.

In one implementation, the output of the camera can be transmitted to a device, for example a tablet computer or the control device 160, in the event that the display area of the mobile device 120 (e.g. screen of a smartphone) is blocked or otherwise inaccessible. The device can be used to define the custom mask (or any other features described herein) and then transmit the data representing the custom mask back to the mobile devices 120. The custom mask can then be applied to images acquired at the mobile device 120.

Figure 9:
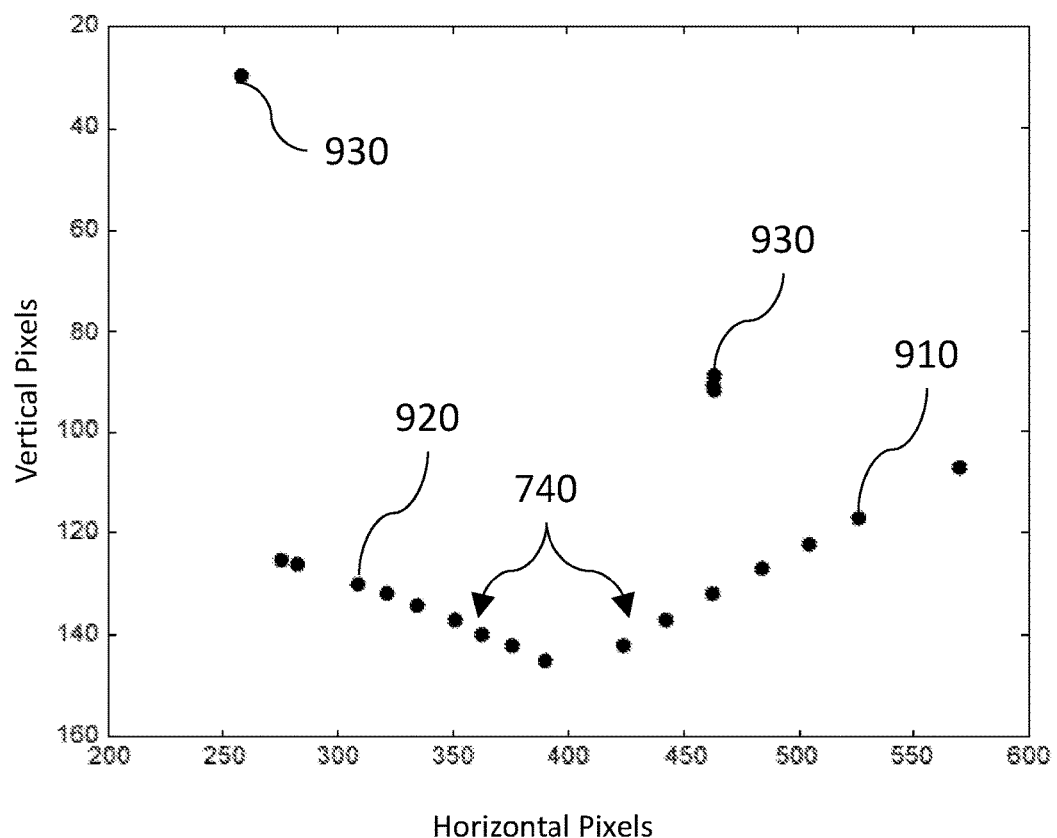
FIG. 9 is a diagram illustrating applying a noise filter to an image in accordance with certain aspects of the present disclosure.

FIG. 9 illustrates applying a noise filter to an image in accordance with certain aspects of the present disclosure. The trajectory 740 of a ball can be expressed as a sequence of ball coordinates. If the ball's trajectory 740 is a parabolic (or nearly so) path, then the application can designate the sequence of coordinates corresponding to that path as a valid ball trajectory 740. In some implementations, the system can include a noise filter that analyzes preliminary determinations of the ball's position in the playing area 110 and discards, as outliers, positions or coordinates of the object 170 that are inconsistent with the expected motion or trajectory of the ball. In the example ball trajectory of FIG. 9, the ball positions trace out two parabolic shapes; a first parabolic shape 910 before a bounce and a second parabolic shape 920 after a bounce. However, several outliers 930 are shown outside the two parabolic paths. The outliers 930 could be a result of movement of the mobile device 120, another object 170 entering the field of view 130, or the like. The application can detect the points that lie along a parabolic path and identify the outliers 930. After the outliers 930 are removed, the ball's trajectory can be determined to a higher degree of accuracy based on the remaining real coordinates of the object 170 in real space or any equivalent projection thereof in either real space or a virtual space. The determination of what is an outlier 930 can be determined according to pre-defined rules, for example, determination of a parabolic path to sufficient accuracy between one or more ball positions, physical/environmental considerations such as wind, ball shape, gravity, estimates of ball speed, or the like.

A layered approach to noise filtering can be applied in some implementations of the current subject matter. Different combinations of methods and algorithms can be applied that will reject the most outlier candidates with the least processing power first, with additional methods or algorithms applied if the earlier ones are not sufficient to obtain an accurate result. If a candidate image fails a test at an earlier level, then the image can be processed according to a second test having a different, and possibly more stringent, criteria. The images that remain after the specified layers are applied can be used for calculating the trajectory. One example of a layered noise filtering approach can include:

1) First, images that do not appear to contain a ball (for example based on a range of acceptable ball colors) are not processed.

2) Second, of the images that pass the first test, reject objects that do not have an acceptable object area (e.g. are clearly too big or too small) and/or do not have an acceptable roundness (e.g. appear square, rectangular, or irregular).

3) Third, of the images that pass the second test, compare the object to the candidate object in an adjacent (preceding or subsequent) images in terms of speed and/or area. The images need not be immediately preceding, in other words there can be image skips, but in generally the images being compared should be proximate in time such that the object should appear very similar in the two images. If the current object is outside an allowable difference in speed and/or area from the adjacent images, then that image is rejected.

4) Fourth, when an impact is identified in the sequence of images, a determination can be made of whether the trajectories shown in the images are parabolic. When the trajectory is not parabolic, one or more images can be deleted until a parabolic trajectory can be identified.

These tests, or any other tests, can be applied in any combination or sequence and the above example should not be considered to be limiting.

Figure 10:
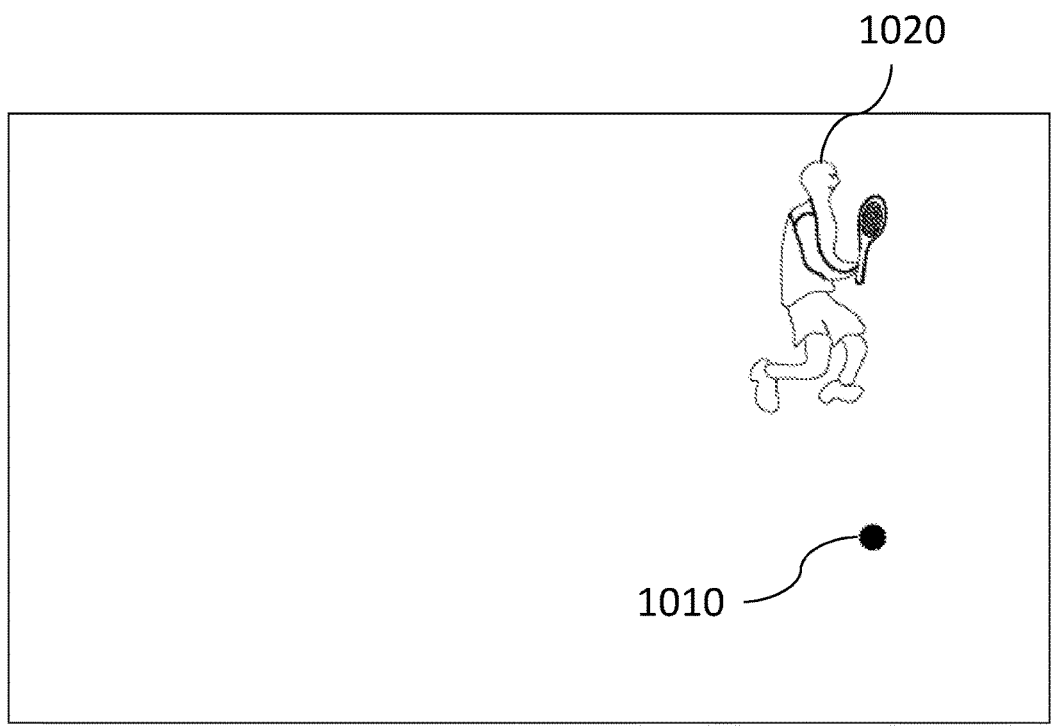
FIG. 10 is a diagram illustrating applying a movement filter to an image in accordance with certain aspects of the present disclosure.

FIG. 10 illustrates applying a movement filter to an image in accordance with certain aspects of the present disclosure. The movement filter can filter image data based on differences between consecutive images. For example, as shown in FIG. 10, as the camera images a court (not shown), a ball 1010, and a player 1020, only portions of the images that correspond to the ball 1010 and the player 1020 change from image to images. The portions that are not moving or are otherwise generally unchanging can be considered to be a static portion and removed from the images. Generally unchanging means that some small changes may be present, but much of the image retains the same features of images that are substantively proximate to the image in terms of image acquisition time. By isolating what changes, the application can more easily determine the location of the ball 1010 and/or player 1020. Optionally, additional filtering logic can be applied depending on the type of object 170 being detected. For example, there can be a player filter and a ball filter. The player filter can specifically look for shape and color signatures corresponding to a player. For example, the player filter can detect features of the approximate size and shape of a player 1020 in the image frame. Also, the player filter can detect the relatively slower motion of the player 1020 as compared to the ball 1010 (at some times). Similarly, the ball filter can look for a ball 1010 of a specific color, shape, or size. Any number of filters can work individually or in concert. For example, once the ball 1010 is identified by the ball filter, even if the player filter satisfies some criteria that could lead to mistakenly identifying the player 1020 (or part of the player 1020, e.g. a hand) as the ball 1010, such as speed and/or shape of the player 1020 or part of the player 1020, then the ball 1010 can remain tracked and positively identified based on identification by the ball filter.

Figure 11:
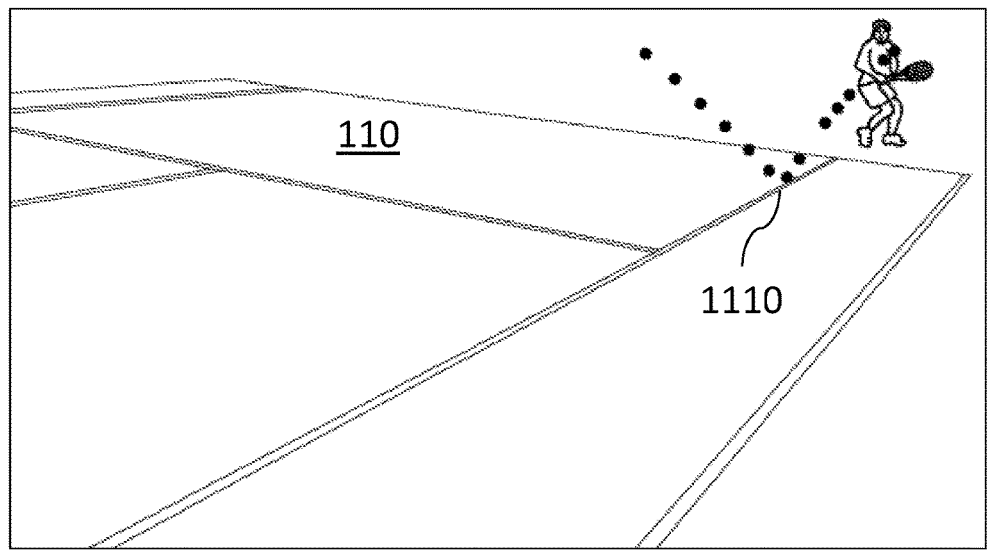
FIG. 11 is a diagram illustrating determining a point of impact in accordance with certain aspects of the present disclosure.

FIG. 11 illustrates determining a point of impact 1110 in accordance with certain aspects of the present disclosure. Any or all of the features described herein can be used to track the position of a ball during play, and also to determine an event position, for example, one or more points of impact 1110 of the ball in the playing area 110. The trajectory of the ball in three dimensions can be determined to be two parabolic (or near parabolic) paths over a bounce. See also the discussion of FIG. 9. If the actual image of the ball at the point of impact 1110 is not captured because of the frame rate of the camera or gaps in the field of view 130 of the mobile devices 120 in use, the trajectories can be extrapolated to intersect the surface of the playing area 110 and/or intersect each other. This can provide an accurate estimate of the point of impact 1110 of the ball in the three dimensional space modelled by the application.

Determining the point of impact 1110 of a ball can include, in some implementations, providing automatically or in response to a command from a user, a displayed image of the playing area 110 with the point of impact 1110 shown. Optionally, images of the ball from frames taken before and/or after the impact with the playing surface can also be shown, as in FIG. 11.

In some implementations where multiple mobile devices 120 are used to image the playing area 110, the event position can be captured by more than one mobile device 120. However, to improve accuracy of determining whether an event (e.g. a ball being "in" or "out" based on a rule) has occurred, the image best corresponding to the event can be further analyzed. As one example, a score characterizing the image quality of the object 170 can be generated for an image from each of the mobile devices 120 that imaged the event. The score can be based on factors that can include an object area of the object 170, a spread of the trajectory of the object 170, a roundness of the object 170, or the like. The factors can be determined based on analysis of the images, for example as described below. The image that has the highest or best score can be selected for determining the event position of the object 170.

Figure 12:
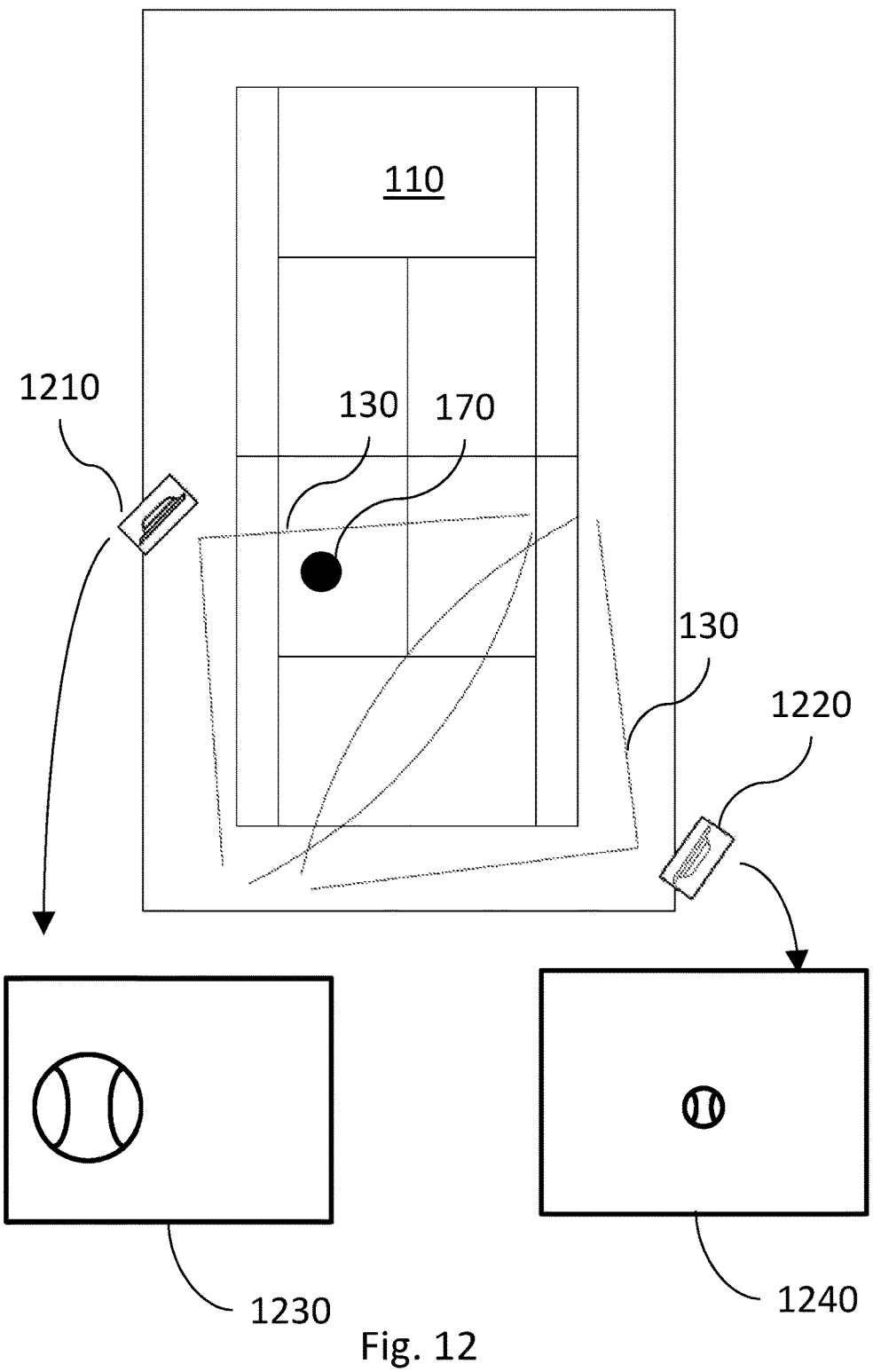
FIG. 12 is a diagram illustrating differences in object area based on proximity to a mobile device in accordance with certain aspects of the present disclosure.

FIG. 12 illustrates differences in object 170 area based on proximity to a mobile device 120 in accordance with certain aspects of the present disclosure. The playing area 110 is shown with the object 170 at a point closer to a first mobile device 1210 than to a second mobile device 1220. An first image 1230 of the object 170 and the corresponding second image 1240 of the object 170 from their respective mobile devices 120 can be compared. The object area can be the apparent area of the object (e.g. ball) in terms of pixels it occupies in the image. For example, for images of equivalent resolution, the number of pixels that make up the image of the object 170 will be larger when the object 170 is closer to the mobile device 120. The number of pixels can also be scaled based on the resolution of the object 170 to obtain an object area that can be compared with those calculated from other images. The number of pixels can be the entire number of pixels of the object 170, or the number of pixels in a particular dimension, for example along a diameter of the object 170. To determine the object area, a boundary can be identified around the object 170 and the object area determined analytically from the boundary size or by pixel counting.

Figure 13:
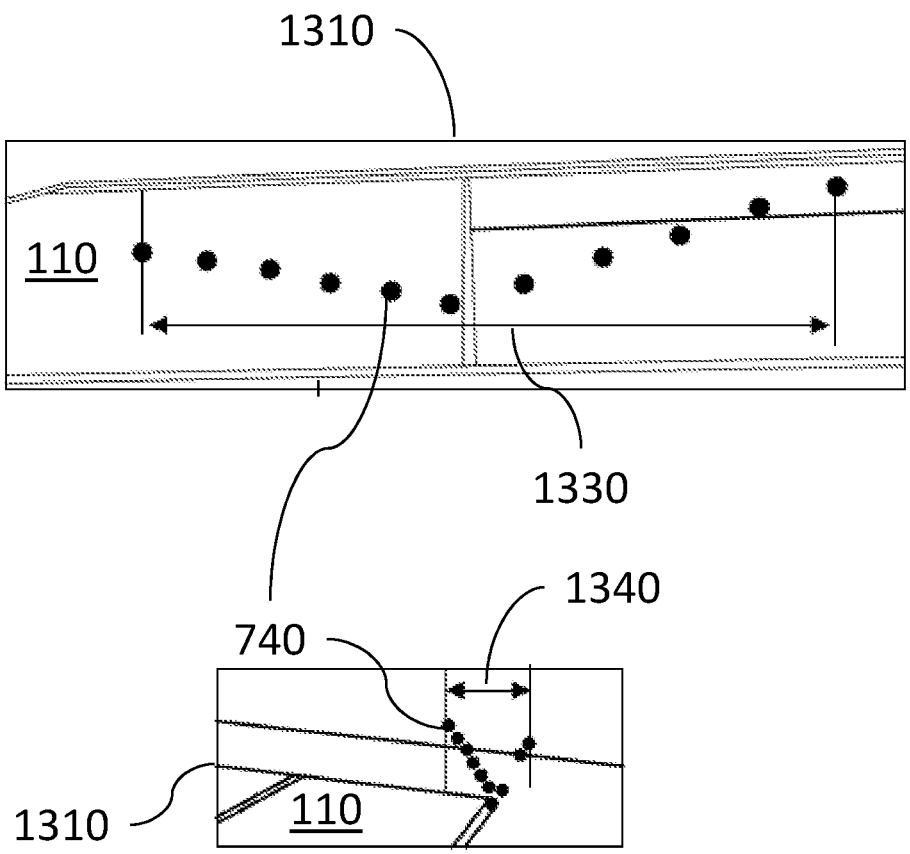
FIG. 13 is a diagram illustrating differences in trajectory spread based on viewing angle from a mobile device in accordance with certain aspects of the present disclosure.

FIG. 13 illustrates differences in trajectory spread based on viewing angle from a mobile device 120 in accordance with certain aspects of the present disclosure. The spread of the trajectory can be determined by calculating the distance (in pixels) between positions of the object at two different times. The spread in different images can be compared by comparing the calculated spread corresponding to the same acquisition times. For example, as shown in FIG. 13, when two cameras imaged a bounce, the trajectory of the ball can be analyzed for a time period before and after the bounce. The top image 1310 and the bottom image 1320 both show the trajectory 740 of the ball over the same time period, but from different camera perspectives. A first spread 1330 can be calculated for the top image 1310 and a second spread 1340 can be calculated for the bottom image 1320. The larger the spread, the more accurate the reconstruction of any trajectory will be because the images of the ball in each frame will not appear to be on top of the other. In this way, the images from the mobile device 120 that have the highest spread can be given additional weight.

Figure 14:
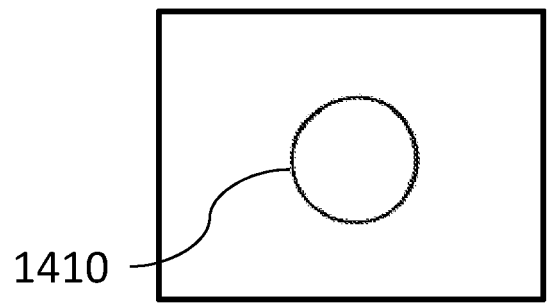
FIG. 14 is a diagram illustrating differences in object roundness taken from images in accordance with certain aspects of the present disclosure.
Figure 14:
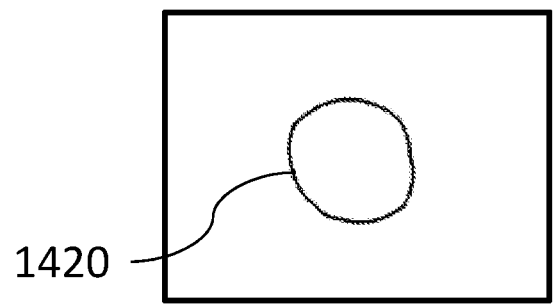

FIG. 14 illustrates differences in object 170 roundness taken from images in accordance with certain aspects of the present disclosure. The roundness of the object 170 can be determined by analyzing the image to define, based on the pixel color, distribution, image gradients, or the like, an outline of the object 170. When the image is large and sharp, as shown in the first image 1410, the roundness can be measured accurately. When the image is small or blurry, as shown in the second image 1420, the outline can appear distorted and thus have a lower roundness. In some implementations, the shape of the ball can be required to be known in order to accurately determine a point of impact 1110. When the shape of the ball (e.g. in terms of roundness) is not able to be measured accurately, the point of impact 1110 can have additional error. Thus, the images which correspond to the ball having a higher roundness can be given additional weight. In some implementations, the roundness of a (spherical) object can be parameterized as $4*\pi*area/(perimeter^2)$. Other measures of roundness (or generally conformity of the image shape to a known or expected ball shape) can also be applied. For example, when the object is a football, the formula above may not always be the best measure of sharpness of an image. The general principle can be applied though, and that is that an outline of the object 170 in the image can be compared to an expected shape to characterize the image quality.

In some implementations, to determine the best images for calculating a point of impact 1110 or other key feature, the above factors (and possibly others) can be combined to determine an overall score for the image. The score S can be, for example, $S=U*A+V*B+W*C$. Here, A can be the normalized ball area, B can be the normalized spread of the trajectory, and C can be the measurement of roundness. The factors U, V, and W can be weights that can be adjusted to provide scores which are found to be accurate. For example, in some implementations, U, V, and W can be given equal weight (e.g. ⅓). Either automatically, based on machine-learning or other feedback algorithms, the weights can be adjusted over time to provide more accurate results. For example, if confirmed, either through use or calibration, that a score (or decision resulting from a score) is inaccurate, the weights can be adjusted until the decision is found to be more accurate.

Game rules can be used to provide additional constraints to the motion tracking code, or to the identification of events (such as what constitutes scoring a point) during a game. Game rules can include, for example, only having a single ball in motion during a game, that the ball must exhibit ballistic (or nearly ballistic) motion during flight (to distinguish it from other moving objects 170 or players), there can only be a single bounce on a racket, the ball cannot bounce in the same court as the direction of the hit before it crosses the net, the ball cannot bounce more than once on each side of the court (used to determine if a scoring event has occurred), that a serve signifies a start of a game, or the like. Game rules can be preset or can be defined by a user.

Figure 15:
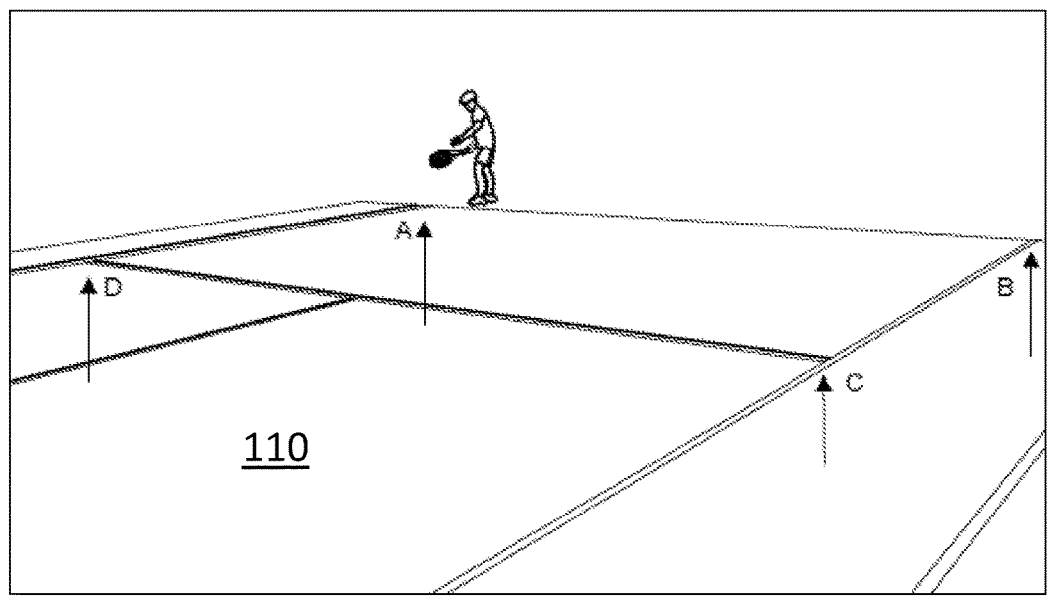
FIG. 15 is a diagram illustrating designation of four non collinear points on the playing area in accordance with certain aspects of the present disclosure.

FIG. 15 illustrates designation of four non collinear points on the playing area 110 in accordance with certain aspects of the present disclosure. The mobile device 120 can be positioned to acquire images containing the four non-collinear points. Examples of these points are shown as points A-D in FIG. 15. The four points A-D can be intersections of court lines or any other fixed reference point. In implementations where the four points are intersections of lines in a court size of known dimensions, the distance between any of the points can be either referenced from a value in memory or determined by the application.

Figure 16:
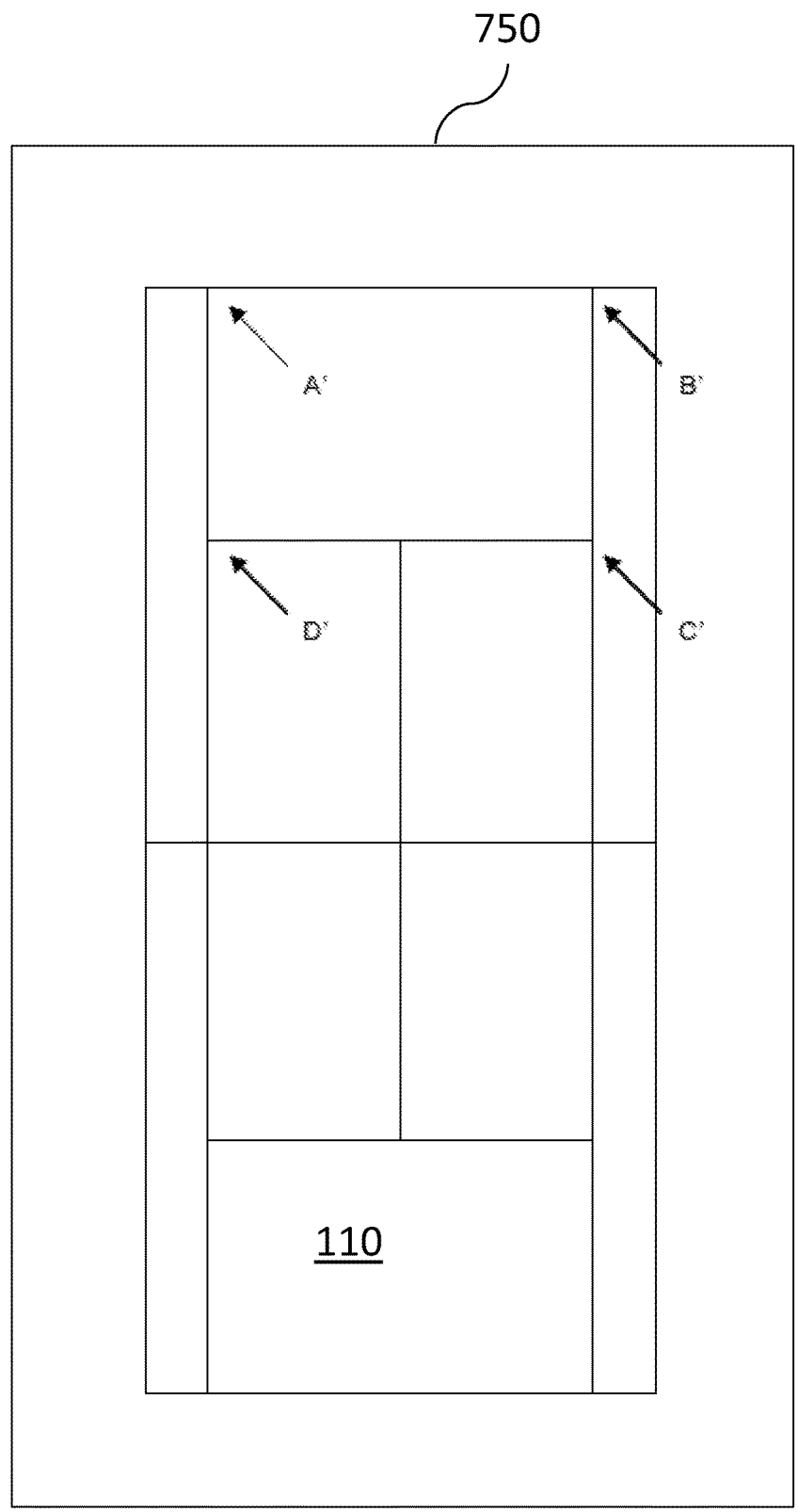
FIG. 16 is a diagram illustrating a top view of the playing area showing the same four non collinear points in accordance with certain aspects of the present disclosure.

FIG. 16 illustrates a top view 750 of the playing area 110 showing the same four non collinear points in accordance with certain aspects of the present disclosure. In FIG. 16, the top view 750 is illustrated with the points corresponding to A-D now labeled as A'-D'. While any coordinate system can be used for the purposes of the calculations described herein, a Cartesian coordinate system with the origin at the upper left hand corner of the court is chosen for the instant examples.

A homography matrix H can be calculated from the four non-collinear points. The homography matrix can be used to transform the view (herein referred to as the "world view") of the playing area 110 taken by the mobile device 120 (as shown for example in 720 and 730) into a top view 750 using the four non-collinear points, or two pairs of lines in the playing area 110.

With the four pairs of non-collinear points (A, A'), (B, B'), (C, C'), and (D, D'), the homography matrix can be estimated using, for example, Direct Linear Transform (DLT) with normalization. This can result in the matrix:

$$H = \begin{bmatrix} h0 & h1 & h2 \\ h3 & h4 & h5 \\ h6 & h7 & h8 \end{bmatrix}. \quad (1)$$

With matrix H, any point p' in the top view can be determined by operating on the pixel coordinates with:

$$p'=Hp. \quad (2)$$

Because each point has an x and a y coordinate, Eqn. 2 becomes:

$$\begin{bmatrix} h0 & h1 & h2 \\ h3 & h4 & h5 \\ h6 & h7 & h8 \end{bmatrix} \begin{bmatrix} x \\ y \\ 1 \end{bmatrix} = \begin{bmatrix} h0\,x + h1\,y + h2 \\ h3\,x + h4\,y + h5 \\ h6\,x + h7\,y + h8 \end{bmatrix} = \begin{bmatrix} x' \\ y' \\ z \end{bmatrix} \quad (3)$$

To convert x', y', z back to x, y, we use:

$$y=x'/z \quad (4)$$

and:

$$y = y'/z. \quad (5)$$

The above formulation is valid only for points that lie on the surface defined by the four non-collinear points A-D. This allows an estimate of the ball speed along the surface of the court and ignores any vertical motion of ball.

The methods described above can be combined to determine the speed of the ball at any desired time or for any particular event, such as a serve or a return. By determining the position of the ball at known times, for example by timestamps applied to image frames acquired by the mobile device 120, the position of the ball in the virtual playing space constructed in the application can be determined for each frame acquired by each mobile device 120. With one camera, it is possible to estimate the lateral (horizontal) speed of the ball, though in some implementations data from multiple cameras can be synchronized and combined.

Figure 17:
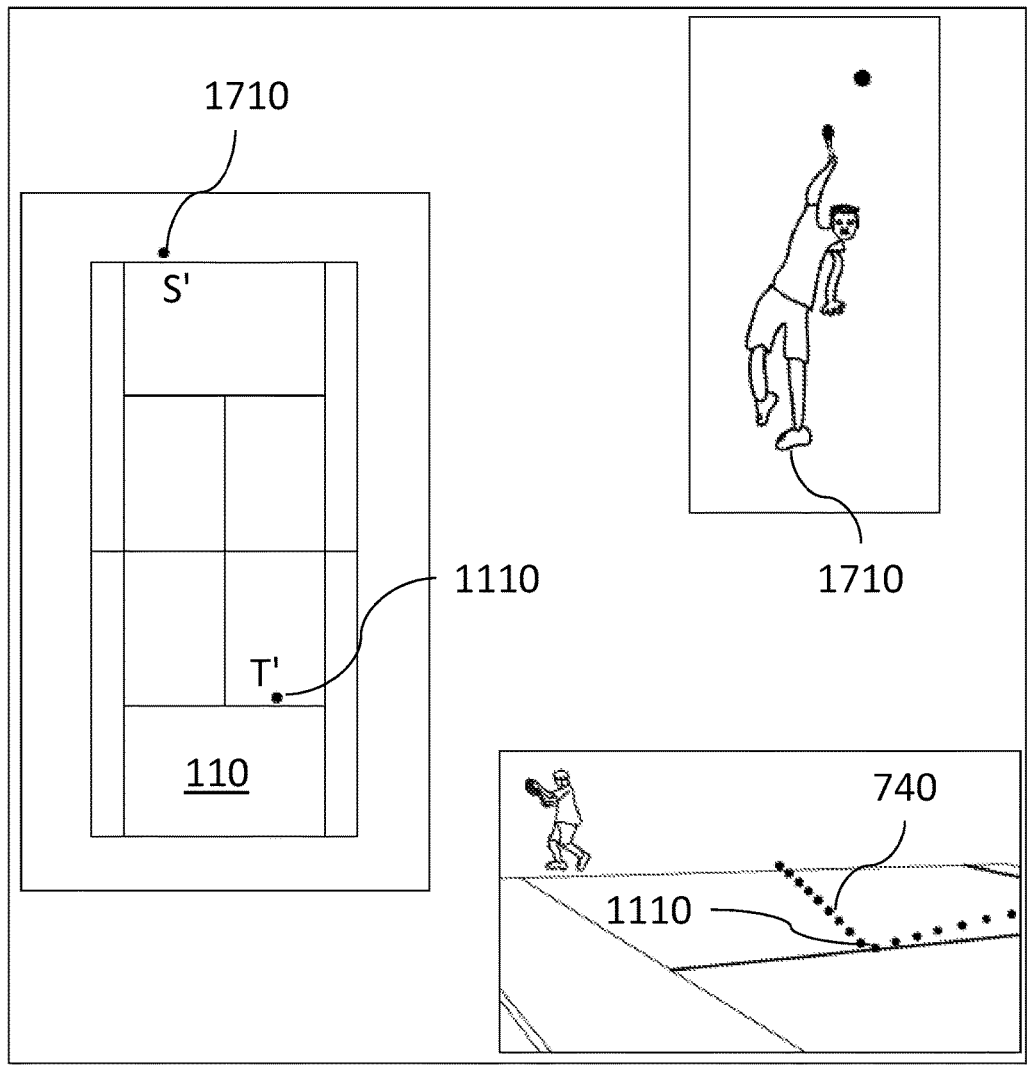
FIG. 17 is a diagram illustrating ball speed determination between a serve point and a point of impact in accordance with certain aspects of the present disclosure.

FIG. 17 illustrates ball speed determination between a serve point 1710 and a point of impact 1110 in accordance with certain aspects of the present disclosure. Simplifying assumptions can be incorporated to facilitate rapid calculation of the ball speed estimate, while sacrificing little in the way of accuracy. First, the flight path of the ball is relatively straight during a hit, for example, between a player's position and a point of impact of the ball. This approximation improves substantially if smaller distances are considered, for example, motion between consecutive image frames. Second, the vertical component of the ball velocity can be neglected. This assumption is built into the example homography matrix described above, which describes a 2-D transformation. Third, the actual ball position can be estimated from the player foot position. Imaging of the player, for example with motion filtering, was discussed in reference to FIG. 10. In this example, the player motion is extracted from the difference between selected image frames to result in a player image. The lowest point of the imaged player is taken to be the foot position or serve position 1710. The specific foot position can be the position of, for example, either foot, a point between the two feet, a projection of either of the above onto the playing area 110, or the like. As shown in FIG. 17 by the player image, the point of contact of the foot with the playing area 110 can be designated as $S=(f_x, f_y)$, where $f_x$ is the X coordinate of the foot position and $f_y$ is the Y coordinate of the foot position. Note that the unprimed quantities designate that this is in the world view. As with the ball position, the point S can be transformed from coordinates in the world view to coordinates in the top view with the homography matrix H. Specifically, the transformation of S can be performed with:

$$S' = HS. \quad (5)$$

Similarly, the position of the point of impact 1110, or point of impact 1110, of the ball with the playing area 110 can be determined based on the imaged locations of the ball. Tracking of the ball motion and determination of the point of impact 1110 in the world view was described in reference to FIG. 11. Using a different homography matrix $H_b$, which corresponds to the transformation of the side of the playing area 110 viewed by a second camera, the point of impact can be designated as $T=(b_x, b_y)$, where $b_x$ is the X coordinate of the bounce position and $b_y$ is the Y coordinate of the foot position, in the world view. Again, the transformation can be performed with:

$$T' = H_b T. \quad (6)$$

Once T is transformed into T', for the top view, the points for T' and S' are in the same coordinate system and can be combined to provide information about the ball trajectory and speed from the point of the serve to the point of impact 1110.

One example calculation of ball speed with the above method is shown. Referring back to FIG. 15 showing the four non collinear points A-D, we can have A=(x, y)=(323, 152). Here, x is 323 pixels from the left border, and y is 152 pixels from the top border. Similarly, B=(788, 179), C=(633, 272), and D=(57, 195).

In this example, the homography matrix, $H_t$, for the top half of the court can be expressed as:

$$H_t = \begin{bmatrix} -7.84390667e-01 & -6.33822051e+00 & 1.04908295e+03 \\ 2.51389440e-01 & -6.24054032e+00 & 7.52080069e+02 \\ -4.31796458e-04 & -1.42800455e-02 & 1.00000000e+00 \end{bmatrix} \quad (7)$$

The four points A-D are then transformed to the top view A'-D' with A'=(128, 88), B'=(371, 88), C'=(371, 249), and D'=(128, 249). The player's foot position on the world view is S=(fx, fy)=(366, 150). A similar transformation, $S'=H_t S$, results in S'=(fx', fy')=(149, 75). To transform the point of impact, the H matrix for the opposite side can be estimated using the same 4 points method giving:

$$H_b = \begin{bmatrix} 1.46067467e+00 & -1.04311281e+01 & 5.65707485e+02 \\ 1.31527157e+00 & -1.10040542e+01 & -4.85754858e+02 \\ 1.40254103e-03 & -2.40503476e-02 & 1.00000000e+00 \end{bmatrix} \quad (8)$$

Again, using $H_b$, the point of impact on the world view can be expressed as T=(bx, by)=(301, 140). Another similar transformation, $T'=H_b T$, results in T'=(bx', by')=(234, 828).

This information is sufficient to find the speed between the point of serve and the point of impact. However, if the speed of the ball is to be determined at a time close to the bounce, then the application can proceed by finding the ball position right before the point of impact. This is described further in reference to FIG. 18, below.

Figure 18:
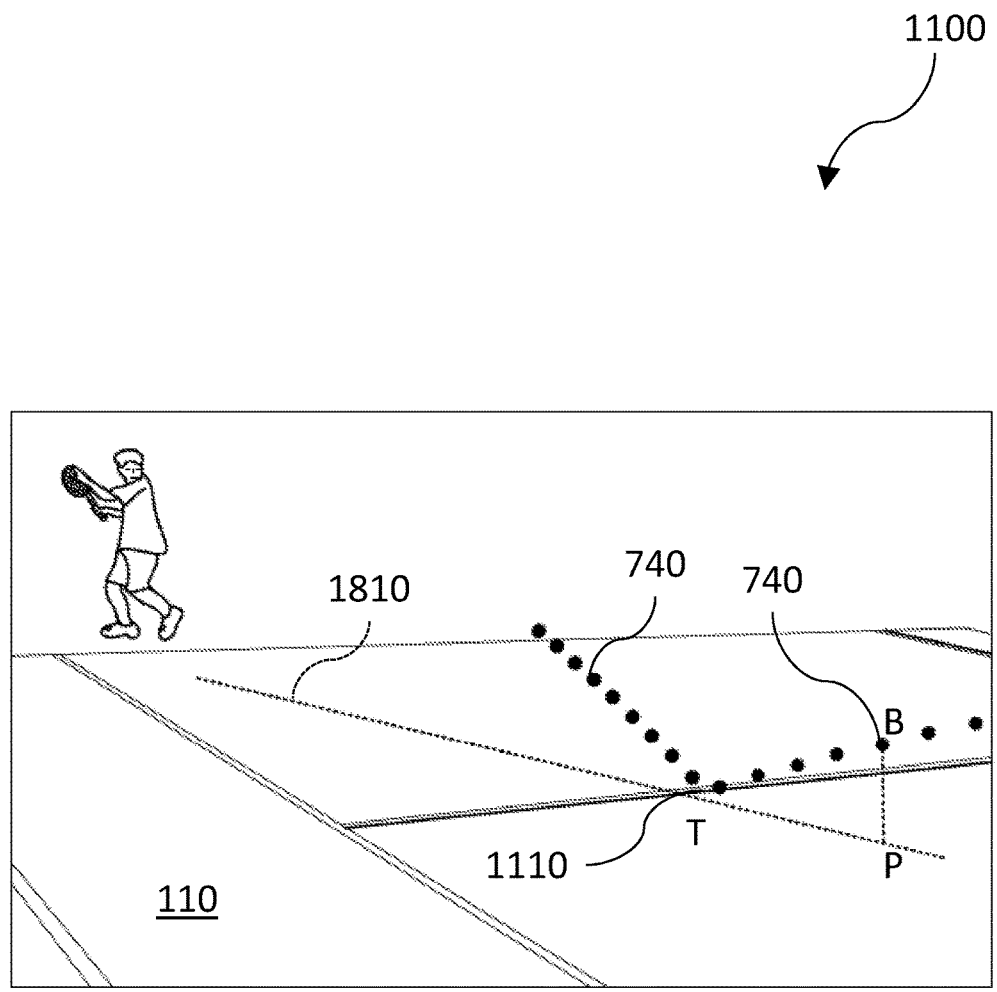
FIG. 18 is a diagram illustrating ball speed determination near a point of impact in accordance with certain aspects of the present disclosure.

FIG. 18 illustrates ball speed determination near a point of impact in accordance with certain aspects of the present disclosure. To compute the ball speed right before the bounce, the application can begin by accessing an image of the ball taken close to the determined bounce time. The position of the ball in the world view can be designated as B. As shown in FIG. 18, the line, herein referred to as the hitline 1810, between S' and T' can be determined because S' and T' are in the same coordinate system. The hitline 1810 can be transformed into the world view by the inverse transformation described above. The hitline 1810 in the world view is shown in FIG. 18, with the point of impact (T) 1110 on the hitline 1810. The ball position B can be projected vertically to the hitline 1810 to mark a point P on the hitline 1810. In one implementation, as with the example described herein, the camera can be assumed to be vertical (not tilted). In another implementation, compensation for any tilting can be made by reading data from connected gyroscopic sensors, or other stored orientation data, in the mobile device 120 that provide data describing the orientation of the camera relative to the playing area 110. The images can be digitally rotated to compensate for the measured camera angle.

In one implementation, P can be determined from the combination of any two points on the hitline 1810 and any two points on the vertical projection of B. Specifically:

$$P=(Px,Py) \quad (9)$$

where:

$$Px = \frac{(x1y2 - y1x2)(x3 - x4) - (x3y4 - y3x4)(x1 - x2)}{(x1 - x2)(y3 - y4) - (y1 - y2)(x3 - x4)} \quad (10)$$

and:

$$Py = \frac{(x1y2 - y1x2)(y3 - y4) - (x3y4 - y3x4)(y1 - y2)}{(x1 - x2)(y3 - y4) - (y1 - y2)(x3 - x4)} \quad (10)$$

where (x1, y1) and (x2, y2) are points on the hitline 1810, (x3, y3) and (x4, y4) are points on the vertical line.

To find P', the appropriate homography matrix for that portion of the playing area 110 can be used, in this case $H_b$, resulting in:

$$P'=H_b P \quad (11)$$

Referring back to the specific numerical example above, P'=(232, 811). A scale factor can also be determined from the top view to the actual court dimension in order to convert distances in the top view to linear distances. In the example given, the conversion is 1:3.392 (e.g., 1 pixel (in the top view units)=3.392 cm).

Figure 19:
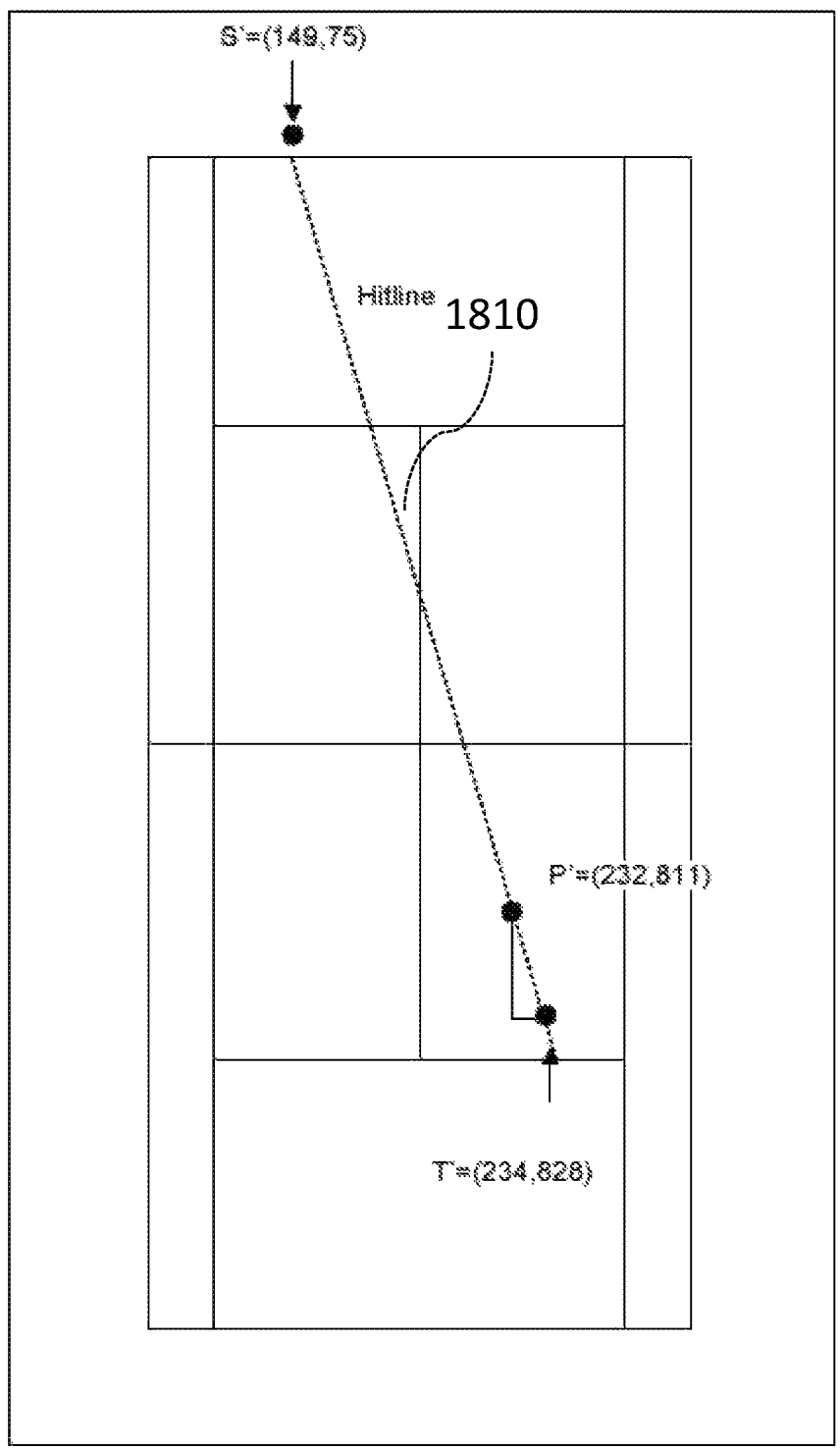
FIG. 19 is a diagram illustrating ball speed determination along a hitline in accordance with certain aspects of the present disclosure.

FIG. 19 illustrates ball speed determination along a hitline 1810 in accordance with certain aspects of the present disclosure. To determine the ball speed in, for example km/hr, the change in x position and y position, over the time span of a given frame interval, can be determined. Here, dx=x component of T'–P' and dy=y component of T'–P'. Then, the distanced traveled by the ball between P' and T' is dl=sqrt (dy^2+dx^2)*R, where R=the scaling factor of 3.392 cm/pixel. This results in dl=sqrt ((828-811) ^2+(234-232) ^2)*3.392=58.06 cm. With a time interval between the ball image at P' and T' of ⅓₀ of a second, the final speed is calculated to be approximately 63 km/h.

The application can enable the user to define several modes of training. There can be a "Fundamentals Training Mode," "Groundstrokes Training," "Drills Mode," and "Training Mode" that can include "Challenge and Response Training," and "Training with Passive Device." Any of these training modes can be enabled by the object tracking functionality described herein.

Figure 20:
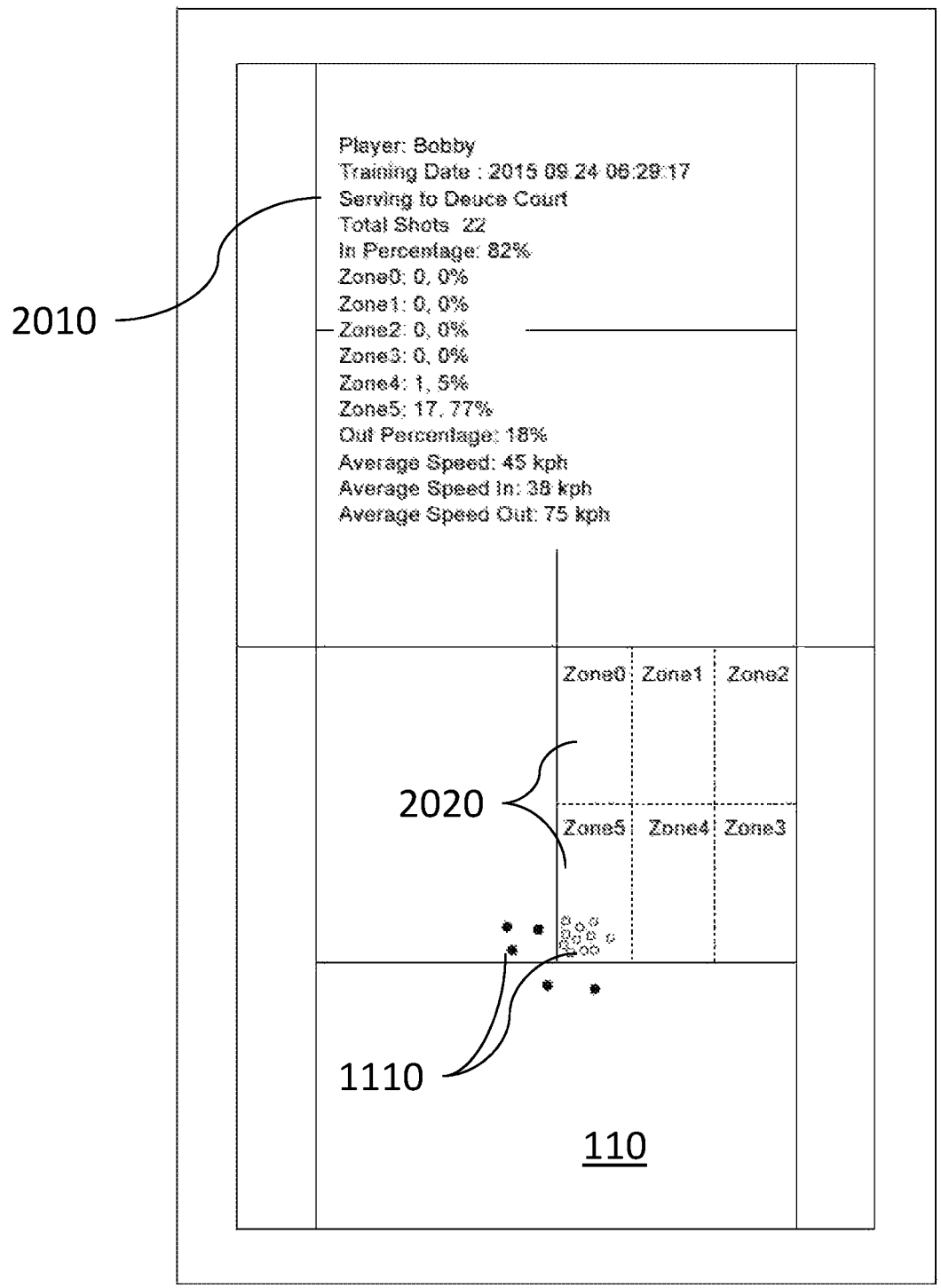
FIG. 20 is a diagram illustrating an example graphical display of points of impact during a fundamentals training mode in accordance with certain aspects of the present disclosure.

FIG. 20 illustrates an example graphical display of points of impact 1110 during a fundamentals training mode in accordance with certain aspects of the present disclosure. The application can track the position of the points of impact 1110 in the playing area 110 and calculate the ball speed on impact as described herein. These two types of data, position and speed, can be collected over a number of serves and/or a specified period of time. Once collected, the data can be analyzed to generate feedback for the player. In one implementation, the application can generate, at an input device 150, control device 160, or any other connected computing device, a performance report 2010 that can allow a user to assess their ability to serve accurately. For example, the user's ability to make the ball impact a specific area or zone 2020 in the playing area 110. Also, the feedback can include displaying the speed at which the ball is travelling. For example, the feedback can be for each serve, a slowest serve, a fastest serve, an average serve speed, or the like. A graphical rendering of the playing area 110, for example that similar to the top view 330, can be displayed on the mobile device 120 running the application, the input device 150, control device 160, or on any connected computing system. As shown in FIG. 20, the performance report 2010 can be displayed as well as graphical indications of points of impact 1110 of the ball on the playing area 110. A visual indication, a color for example, can be applied points of impact 1110 that indicate whether the impact point was within the zone selected for the training mode. In the example shown in FIG. 20, the points of impact 1110 are solid when outside a designated zone 2020 and open when inside the designated zone 2020.

Figure 21:
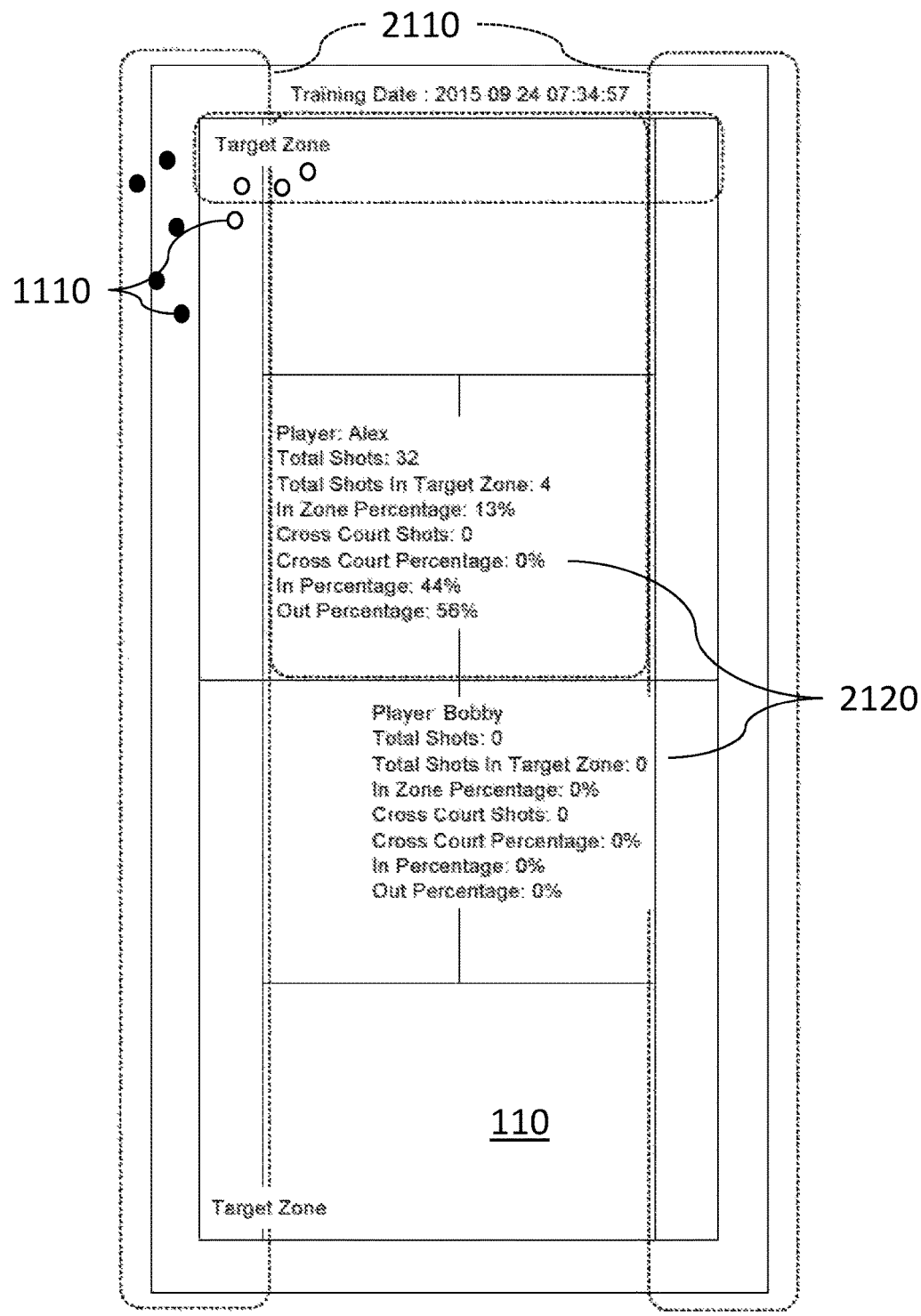
FIG. 21 is a diagram illustrating an example graphical display of points of impact during a groundstrokes training mode in accordance with certain aspects of the present disclosure.

FIG. 21 illustrates an example graphical display of points of impact 1110 during a groundstrokes training mode in accordance with certain aspects of the present disclosure. Similar to the fundamentals training mode, the groundstrokes training mode can analyze the points of impact 1110 relative to a target zone 2110 and/or pre-defined boundary locations. In this example, target zones 2110 can be selected by a player or automatically specified by the system. Points of impact 1110 that are both in the target zone and in the court boundary (as considered "in" for the particular stroke) can be recorded as "in." Similarly, points of impact 1110 that are in the target zone 2110 but are out of the court boundary can be recorded as "out." Points of impact that are not in a target zone are not recorded. In the example graphical output shown in FIG. 21, the points of impact 1110 can be distinguished by, for example, color, shape, or the like. As with the fundamental training mode, statistics on the points of impact 1110 can be compiled by the application and displayed to a user as a performance report 2120.

The application can also support a "drills mode" that can include user-generated input to the mobile device 120 or the wearable device 150 that initiates a type of activity to be tracked by the mobile devices 120. While similar to the fundamentals training mode, the drills mode can include a pattern of activities, specified by the user or pre-determined and stored in computer memory, which the user can attempt. In tennis, for example, the drill can include serves or strokes. Customized zones can be created on the wearable device 150 or the mobile device 120 that define where a serve or stroke should land. Also, pre-defined custom zones or zones corresponding to imaged regions of the court can be selected from a library and loaded into the system. The user can start/stop the session by input to the mobile device s 120 and/or the wearable devices 150. During the session, the system can provide feedback to the user based on tracking the ball or the player position as the player executes each specified action in the drill. Feedback can include indications of the ball being in/out of bounds, player position, ball speed and/or direction, or the like. Feedback can be provided to the user via the mobile device 120 or wearable device 150.

Related to the "drills mode" there can also be a "training mode" that generates and compiles statistics based on the imaged actions or ball movements. The challenge and response training can be similar to the drills mode, but instead of the user selecting the action to perform, the application determines it. Analysis and feedback can be substantially similar to that performed in drills mode. With passive device training, images of the user performing actions can be stored and saved by one or more cameras. In a post-processing setting, the stored video can be analyzed as if it was taken in real-time and feedback provided to the user in the form of statistics or other graphical or textual output.

In one implementation of the training or drill modes, there can be a mobile device 120 viewing the player and at least one other mobile device 120 viewing another region of the playing area 110. The system can detect and timestamp a player action, for example, hitting a ball, making a serve, returning a ball, or the like. The result of the player action can be synchronized with the timestamped player action. Statistics stored in memory corresponding to the action and the result can be updated as play continues. For example, the system can recognize a serve and update statistics relating to serve speed, ball placement on the opposing side of the playing area 110, or the like. The video and accompanying statistics can be recalled from the system at any time for review on the mobile device s 120, wearable devices 150, or on any other connected computing system. There can be a number of identifying features associated with the recorded events, for example, the number of players, game type, player profiles, handedness, or the like.

Statistical data that can be stored, updated, and accessed by the user through the system can include, for example, count and percentage of different stroke types during a session or game, count and percentage of in/out shots, top, average and lowest speed of serves, shots won on service, social ranking on stroke speed and accuracy, ranking from participants of social challenges based on speed or accuracy of strokes, or the like. Analytics can further include points won/lost, shot types, speed, placement, opponent history, date/time, target zones, or the like. Any of the statistics/analytics can be analyzed or presented in any combination, for example, points won against a certain opponent, serve placement in a certain zone when ball speed is over 120 km/h, or the like. All historical/statistical data can be stored on the mobile devices 120 or remotely, for example, in databases or cloud-based servers.

In some implementations, one or more mobile devices 120 can be placed around the playing area 110. Mounts or stands can be included to provide a consistent or stable position for the mobile devices 120.

A match can be initialized at the control device 160 by creating a match identification.

One or more mobile devices 120 can be registered to the control device 160 to associate the mobile device 120 to the match identification. The mobile device 120 can also be registered to a specific mobile device 120 position. The mobile device 120 positions can be locations on or around the playing area 110 that can provide improved coverage of the playing area 110 based on the field of view 130 of the cameras in the mobile devices 120. In some implementations, a sufficient number of mobile devices 120 can be registered and positioned such that both ends of a playing area 110 are able to be imaged.

The lighting conditions of the court, whether static or dynamic, can be taken into account by configuring the system to best resolve the object 170, ball, player, court lines, or the like. For example, parameters that apply to the images can be adjusted to modify the captured images to obtain better resolutions. These parameters can include, for example, brightness, contrast, color, shading, or the like.

The system can calibrate the white balance, or other graphical characteristic of the images, to provide the sharpest most accurate images of the object 170, player, court lines, or the like. The calibration can also be performed with user input to adjust the image features. In some implementations, the white balance can be calibrated to maintain a predefined brightness of a portion (or all of) the images. For example, in response to changing light levels or conditions, such as intermittent cloud cover, sun motion, changes in artificial lighting, or the like, the calibration can be dynamically performed by the system to maintain a predetermined optimal or desired image quality. This feature can be performed automatically by the system based on detected changes in lighting conditions, such as with a light sensor, analysis over the overall brightness of the images, or the like. Similarly, the calibration can be performed manually by a user at the mobile device 120, control device 160, or any connected computing system.

When ready, the match can be initiated at the control device 160, a mobile device 120, or other input device 150 in communication with the control device 160.

A current score of the match can be maintained using a scorekeeping function. Also, the control device 160, a wearable device, or the like, can display the current score.

The system can accept challenges from the players and a challenge output can be displayed at any of the connected devices. In addition, output can be generated at any of the connected devices that displays, for example, instant replays, views of the object trajectory, computer generated animations of the object trajectory, a top view of the virtual space showing the ball impact location and/or the object speed. In some implementations, the scorekeeping can be dependent upon the output when the output decides whether a scoring event has occurred.

Figure 22:
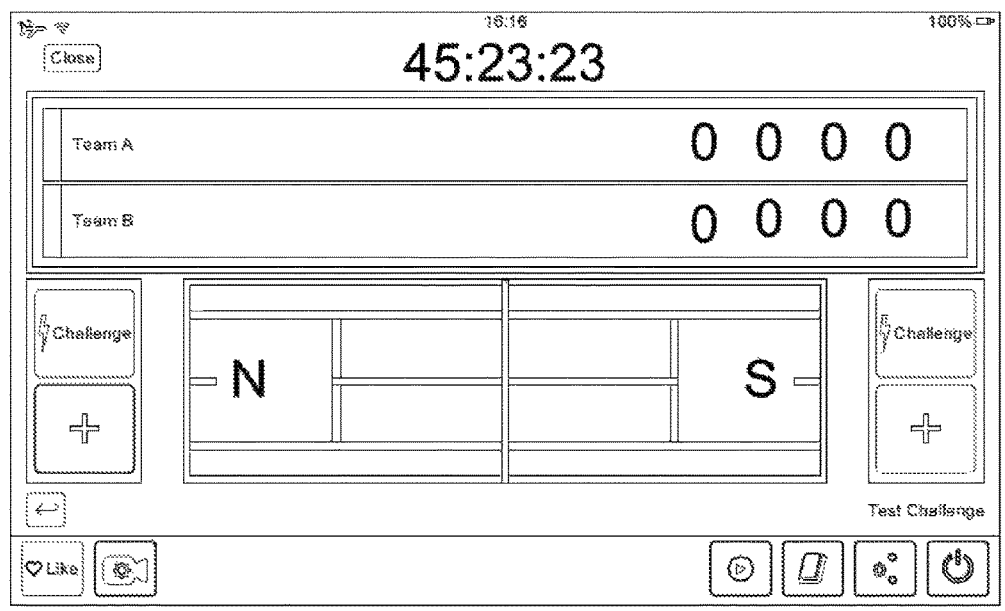
FIG. 22 is a process flow diagram illustrating a remote umpiring interface in accordance with certain aspects of the present disclosure.

FIG. 22 illustrates a remote umpiring interface in accordance with certain aspects of the present disclosure. As described herein, the control device 160 can be used by an umpire, referee, official, or other user to manage the match. At the control device 160, a scoreboard can be displayed as a graphical user interface. The scoreboard can include, for example, a points area for the players, a challenge indicator, a score increment button, a graphical representation of the playing area 110, a like button, etc. The points area can display the current points according the type of match. As shown in FIG. 22 the points area is showing the points for four sets of a tennis game. A challenge indicator can be used to indicate a challenge initiated by one of the players or can accept user input (e.g. a touchscreen) for the control device 160 to initiate a challenge on behalf of one of the players. The like button can initiate a transfer of images to one or more other computers, social media postings, or the like. The transfer can include sending the images over a specified period of time relative to the like event. The images can include images from any or all of the mobile devices 120.

The control device 160 can be configured to allow simultaneous umpiring of multiple matches. In some implementations, there can be a dashboard screen displayed at the control device 160. The dashboard screen can include a plurality of buttons (which can be areas on the dashboard screen that can be touched, selected with a mouse, or the like) that, when activated, access the scoreboard screen for that match.

Figure 23:
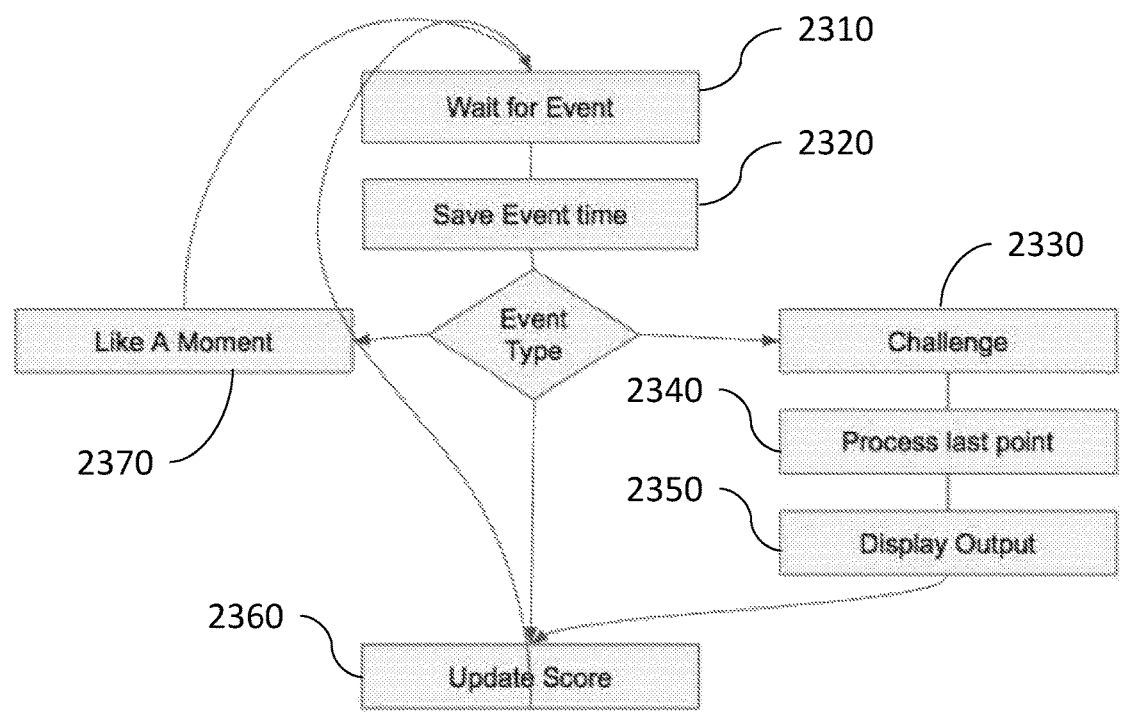
FIG. 23 is a process flow diagram illustrating event handling in accordance with certain aspects of the present disclosure.

FIG. 23 illustrates event handling in accordance with certain aspects of the present disclosure. The application described herein can handle many types of events that are initiated or identified by a player. Events can include, for example, scoring a point, making a serve, returning a ball, a ball going out of bounds, forehand returns, backhand returns, volleys, smashes, or the like. Some events can be detected automatically by the application. In such cases the application can, at 2310, wait until an event is identified, then at 2320 save the record of the event as well as a timestamp, in a computer memory for later analysis or recall.

Event logic can be applied to portions of recorded video content to further identify actions of interest during use.

Four examples of event logic can include serve detection logic, ball-ground impact logic, return stroke logic, and end-of-point. Serve detection logic can determine a first serve by identifying an extended time without ball motion, the first ball motion after the user has entered a score (retroactive identification), and a near vertical ball motion (a toss) followed by a forward or lateral ball motion. A second serve can be detected by identifying that a first serve was already logged and that a service motion was detected.

Ball-ground impact logic can include, for example, detecting a reverse in vertical direction or intersection with the modelled surface of the playing area 110.

Return stroke logic can include, for example, player handedness, a forehand swing, a backhand swing, and a volley. A forehand swing can be determined by, for example, the center of mass of the player, with the racket is on the left of the ball locking into the net for a right handed player at the time of a return. Also, a reversal of the horizontal direction of the ball in the direction of the net can be used as part of determining a forehand swing. Similarly, a backhand swing can be determined by, for example, the center of mass of the player, with the racket is on the right of the ball locking into the net for a right handed player at the time of a return. A volley can be determined by a reversal of the horizontal direction of the ball before a ball-ground impact is detected.

An end-of-point can be determined by an extended time without meaningful ball motion or the time preceding the input of a user updating the score. In any of the events, the thresholds that determine them can be defined by the application, or in response to user-input, to customize or improve the accuracy of the event logic.

In one implementation, at 2330, the application can respond to a "challenge" event. A challenge event can be when a user thinks a ball may or may not be in bounds, but is not sure, or there is a dispute between players, or the like. The application can initiate the processing required for the challenge event in response to user-generated input, such as commands by voice, keyboard, touch-screen, or the like. The challenge event can also be initiated from commands received from the wearable device, the calibration device, or any connected computing system. A timestamp for the challenge event can also be recorded by the application upon receipt of the command. After the challenge event has been resolved, at 2340, the point can be processed according to the resolution. In response to a challenge event, the system can, at 2350, display a series of output, including images on the wearables, mobile devices 120, or the calibration device, of the last relevant ball position. In one implementation, the output can be from the start of a point, as determined by the application, to the time of the challenge event.

The user and/or the system, in response to a detected scoring event or a determined outcome to a challenge event, can, at 2360, update a score for the game in the application. In some implementations, the player can have priority over the automatically calculated score updates. This can allow line calls or other types of judgements according to preprogrammed rules of the match to be resolved and an indication of the call to be electronically provided or displayed to any of the connected computing systems. The line calls, scoring events, and so on, can be based on the analysis of the video acquired by the mobile devices 120 as described herein.

Also, at any time, an event, data recorded relating to the event such as video and/or audio, can, at 2370, be shared via a network link to other networked computers. The command to share can be initiated by the application detecting a voice command, device input, a gesture, or the like. The sharing can also include indicating a "like," or other feedback/opinion metric associated with a social media platform. After the processing of events, the application can continue to process images and wait for another event to occur.

In one implementation, the application can compile and distribute data including video and/or audio that corresponds to one or more detected events. These events can include, for example, automatic or manually configured close-up views of each player during key moments, results from challenges, events that were "liked," points of interest such as points with a long play time, hits with no returns and close lands close to the base line, serves with high speed, serves placed at or near corners, unreturned serves, returns that result in a point, or the like. Such events can be set to be compiled automatically based on event detection and the player can configure the application to include or exclude any combination of events from the compiled data file.

Figure 24:
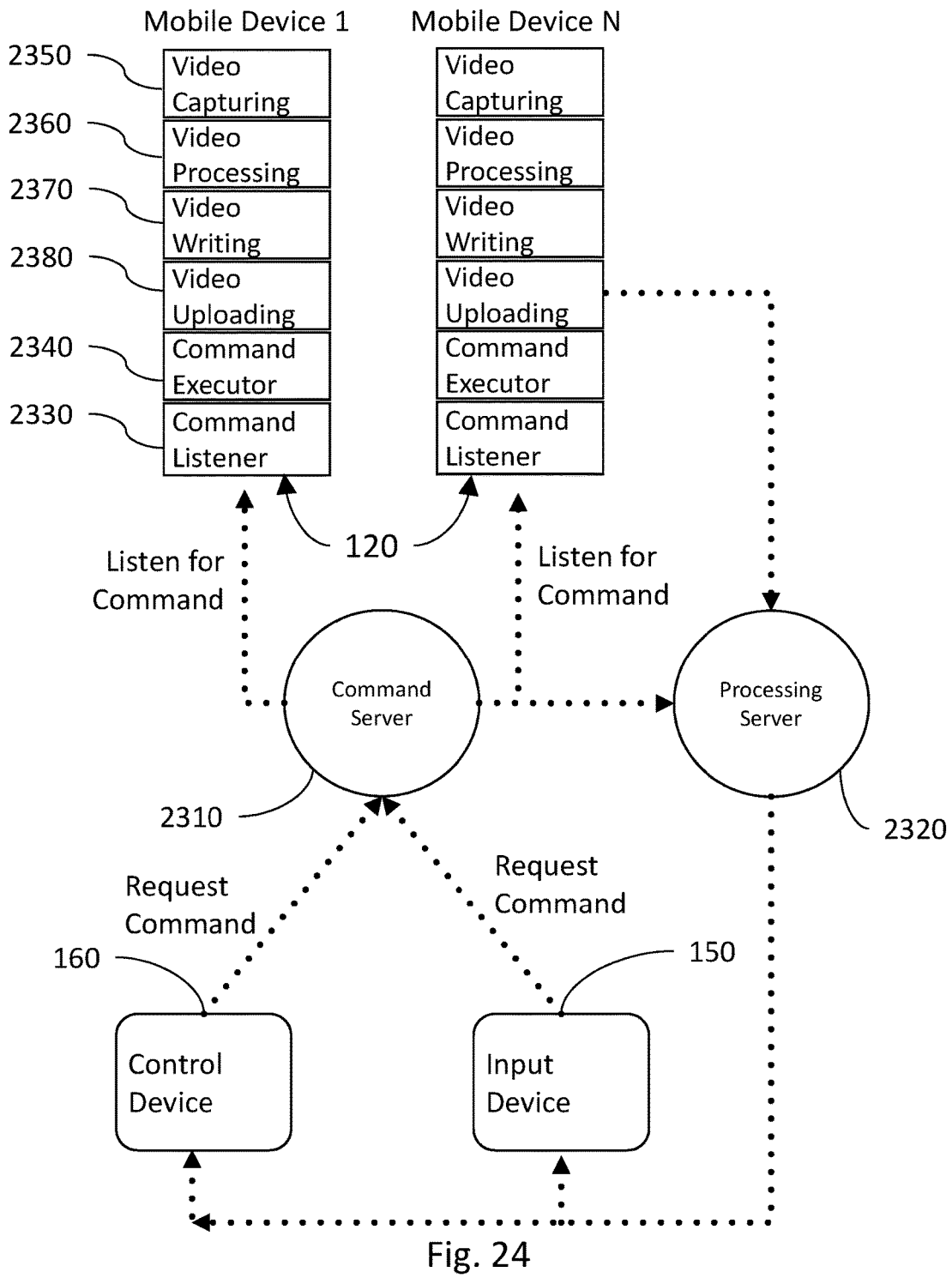
FIG. 24 is a diagram illustrating a simplified system architecture in accordance with certain aspects of the present disclosure.

FIG. 24 illustrates a simplified system architecture in accordance with certain aspects of the present disclosure. The command server 2310 can act, among other things, as a relay between command requests from the control device 160, the input device 150, or a processing server 2310. The command server 2310 can receive commands from the control device 160 or input device 150 and translate those command requests for transmission to the mobile device 120. For example, receiving a challenge request as a command from the control device 160 can cause the command server 2310 to transmit a command to the mobile devices 120 to transmit some portion of stored images to the processing server 2310, the control device 160, or the input devices 150. Any number of mobile devices 120 can listen for commands from one or more command servers 2310. In one implementation, all of the mobile devices 120 paired to a particular match can listen for commands from a single command server 2310. In this way, processing equivalent commands can be performed with a minimum of processing power and/or physical hardware (e.g. this eliminates the need for multiple control devices or the need for a mobile device to be listening to multiple communication channels). This can allow efficient scalability of the system to many control devices 160 and mobile devices 120.

The architecture of some of the software present in the mobile device 120 can include, for example, a command listener subsystem 2330, a command executor subsystem 2340, a video capturing subsystem 2350, video processing subsystem 2360, video writing subsystem 2370, and a video uploading subsystem 2380.

The command listener subsystem 2330 can continuously listen for commands issued to the commands are the commands can tell the mobile device 120 the actions to perform, such as to calibrate the mobile device 120 or to execute a challenge. The command server 2310 can be located in the cloud, as a remote server, or can be a local server. When a command server 2310 receives a command, all mobile devices 120 compared to the same match can be notified of the command. In some implementations, the command listener 2330 and command server 2310 can communicate over Wi-Fi or cellular networks using a publish/subscribe pattern according to standard Internet protocols. A publish/subscribe or pub sub message pattern can be used to send messages between a sender (publisher a receiver (subscriber). A publisher, in general, can have something of interest that one or more receivers may be interested in. If a receiver is interested in receiving messages or commands from a particular publisher, the receiver can subscribe to that publishers channel. Once subscribed, the receiver can receive messages from that channel. In one implementation, the publish/subscribe pattern can be implemented with, for example, a message bus, message-oriented middleware, message queues, implementation of TCP/IP sockets, or the like. Also, the command listener subsystem 2330 can listen for any commands that are issued which contain a particular match identification and device identifier pair, or combined key.

As described above, the command listener subsystem 2330 can include multiple communication channels. Each channel can be identified by a match identifier or a combination of match identifier and device identifier. In some implementations, when a mobile devices 120 paired with a match, a specific set of channels can be established. The channels can be grouped according to topics. The topic can be a related logical group of channels. In one implementation, one or more of the following topics can be established, a command topic, calibration topic, challenge topic, likes topic, scorekeeping topic, or the like.

The channels in the command topic can be used to send and receive commands, command parameters, and acknowledgments. Command such as calibrate, challenge, like, to score, or the like, can be used to control the behavior of the connected mobile devices 120. Depending on the nature of the command, further communication between the mobile devices 120, servers, and control device 160s, can be required.

One implementation of the workflow utilizing the command topic can include a requester, such as a control device 160 or other input device 150, pushing a command to the command server 2310.

The mobile device 120 can listen on the command channel to receive the request.

The mobile device 120 determines if the command should be executed based on predefined criteria and the command parameters. For example, when a command has an expiration date, if the expiration date has passed then the command can be ignored by the mobile device 120. As another example, a mobile device 120 may not be required to execute the command when the command only affects a specific location in the playing area 110.

When the mobile device 120 determines that the command should be executed, the mobile device 120 can publish an acknowledgment back to the command server 2310.

When the mobile device 120 determines that the command should not be executed, the mobile device 120 can ignore the command.

The mobile device 120 can then execute any allowed commands, and can implement additional workflow depending on the nature of the command.

The workflow utilizing the calibration topic can perform the calibration of the mobile device 120. The calibration process can require the mobile device 120 to first captured image, perform an automatic calibration of the mobile device 120, and in some implementations allow the user to fine-tune or record the calibration results. One example of a calibration workflow can include the control device 160 transmitting a calibration request to the command server 2310 across the command channel.

The mobile device 120 listening to the command channel can receive the request.

The mobile device 120 can determine that the received command is a calibration request.

The mobile device 120 can acknowledge the request back to the command server 2310.

The mobile device 120 can begin the calibration process, for example by capturing an image or beginning a video capture.

The mobile device 120 can publish the image or video to an image channel with the image or video including the device identifier. In this example, the mobile device 120 is a publisher for a different channel.

The mobile device 120 can publish the image across the image channel and send a completion status to the command server 2310 to indicate that the image has been sent.

The control device 160 can listen for the image message from the image channel. Here, the control device 160 is now a receiver for the image.

The control device 160 can display the image to the user wants it is retrieved from the image channel.

The control device 160 can perform an automatic calibration using the captured image.

The control device 160 can allow the user to perform fine tuning of the calibration. The fine-tuning can be done through the user interface of the control device 160 to capture the changes made by the user when performing the fine-tuning. Further details of fine tuning the calibration can be found in the discussions of FIGS. 4 and 5.

The control device 160 can then publish the final calibration results to a remote server, for example, the processing server 2310, command server 2310, any of the mobile devices 120, or any other connected computing system.

The challenge workflow utilizing the challenge topic can include the control device 160 or an input device 150 initiating a challenge request. The request can be published to the command server 2310. The mobile device 120 can listen on a challenge channel for the challenge request. Any number of mobile devices 120 can listen to the challenge channel. All mobile devices 120 that received the challenge request can perform the appropriate response to the challenge request simultaneously.

In some implementations, the response can include the mobile device 120 acknowledging the request to the command server 2310.

The mobile device 120 can push the image or video files to the processing server 2310.

The processing server 2310 can publish the processing status to the command server 2310 as it processes the image or video files.

The control device 160 can listen to a processing status channel used by the processing server 2310. The control device 160 can display the results from the processing server 2310 when completed.

The like workflow utilizing the like topic can include an input device 150 or control device 160 initiating a like request. The like request can be a request to share some portion of video content or images to another user through the Internet and communicate a favorable opinion of an event that has occurred. The like request can be published from the input device 150 for the control device 160 to the command server 2310. The mobile device 120 can listen on the like channel and received the like request.

The mobile device 120 can acknowledge the like request back to the command server 2310.

In some implementations, the response to the like request can include the mobile device 120 acknowledging the like request to the command server 2310.

The mobile device 120 can push the image or video files to the processing server 2310.

The processing server 2310 can publish the processing status to the command server 2310 as it processes the image or video files.

The control device 160 can listen to a processing status channel used by the processing server 2310. The control device 160 can display the results from the processing server 2310 when completed.

The scorekeeping workflow utilizing the scorekeeping topic can enable publishing of the latest current scores of a match to one or more devices. Any mobile devices 120, consoles, or websites subscribing to this channel can receive real-time scores corresponding to the match. The scorekeeping workflow can include initiating a score up a request by an input device 150 for a control device 160. The score update request can be published to the command server 2310.

Any mobile device 120, control device 160, website, or the like, that is listening to the score channel can receive the score update request. After receiving data containing the updated score, the display of the mobile devices 120, control device 160, website, or the like, can be updated to display the new scores.

The command executor subsystem 2340 on a mobile device 120 can receive the request and associated parameters from the command server 2310 and perform the requested action locally on the mobile device 120. When multiple mobile devices 120 receive the same request, each device can perform the requested action accordingly. An execution status can be sent to the command server 2310 by the device until the requested action is completed. The execution status can provide an indication of what process is being executed and the progress towards completing the execution.

The video capturing subsystem 2350 on the mobile device 120 can include video capturing where images or video files are stored in a memory and can be accessed by other subsystems at the mobile device 120 for use or transmission to a requested server. The video capturing subsystem 2350 can also include buffering systems and methods described herein that can provide gapless or uninterrupted video recording.

The video processing subsystem 2360 can process videos stored in the buffer, or any other memory at the mobile device 120, and can be processed locally to perform filtering and event detection on the device. The processing can occur continuously, or in response to a specific request by another subsystem in the mobile device 120 or from the command server 2310. In some implementations, the amount of video processing performed on the mobile device 120 can be dynamically adjustable such that if the processing power of the mobile device 120 is abundant one or more of the filters can be applied to the images being processed at the mobile device 120. The remaining filters can then be deployed on a backend server, for example the processing server 2310. For mobile devices 120 with lesser processing capability, all of the filters can be executed at the processing server 2310, bypassing the video processing subsystem 2360 on the mobile device 120.

The video writing subsystem 2370 can partition video or images stored in one or more buffers, and write the video or images into archived files in response to a request from a user, another subsystem of the mobile device 120, the command server 2310, or the like. The partitioning can be performed concurrently with the buffering to record video without gaps or frame drops between different video segments, even when recording at high frame rates. In some implementations, the writing can be performed by writing the archived files to a numbered set of files in a particular sequence.

As used herein, the term "archived files" can refer to the video files (e.g. mp3, mp4, mov, rar, etc.) stored in the file system of the mobile device 120. Buffered video files can be read and written to archived files when a buffer is full or as requested by the control device 160 or an input device 150. In some implementations, when the buffer is not large enough for continuous capturing and processing, video can be written to archived files with system generated unique identifiers (e.g. UUID1.mp4, UUID1.mp4, etc.).

In some implementations, any of the events, including challenge events, can initiate the transmission of images from a memory buffer in one or more of the mobile devices 120. Buffering can be done in cases where memory, processing power, or transmission rate between devices is limited. As one example, a transmit command can be received at a mobile device 120. The control device 160 can then transmit buffered images from the memory buffer in the mobile device 120 to the control device 160, the command server 2310, the processing server 2310, or the like. During image acquisition, images from a prior specified time range can be stored in the buffer. The time range, or buffer time, can be preset or specified/modifiable by a user. For example, the system can be configured to store the last 20 seconds of video in a buffer. When the transmit command is received, the mobile device 120 can transmit the last 20 seconds of video (or however long the buffer time is configured for) from one or more buffers to a specified target device, for example, the control device 160, command server 2310, or processing server 2310.

The memory buffer can be made up of a single buffer, or can include multiple buffers. In some implementations, the process of writing to multiple buffers can include alternately writing the buffered images to a first buffer and a second buffer. The alternating can switch between the writing to the first buffer and the second buffer every elapsed buffer time. For example, images can be written to a first buffer for 20 seconds. Then, images can be written to the second buffer for 20 seconds. When images are being written to another buffer, the images in the first buffer, or any of the buffers not currently being written to, can be processed or analyzed according to any of the methods described herein. When a buffer is full, or in response to a write instruction, the video files in a buffer can be written to archived files. A separate thread can be generated to send the archived files to the processing server 2310 while the mobile device 120 continues to record video and write buffered video to archived files. Though an implementation with two buffers is described, any number of buffers can be added and any buffer time can be specified. Also, though the example buffer time of 20 seconds is given, any buffer time can be used, for example, 1, 5, 10, 30, 60, or 120 seconds. The buffer time can also be limited only by the memory constraints of the device, for example, if the device is capable of storing 1 GB of images, and each image was 10 MB in size, then the maximum effective buffer time could be 100 seconds. When the buffer time requested exceeds system capabilities, the returned video can correspond to the available video in system memory.

In other implementations, the buffering feature can be incorporated into the processing of a challenge request. For example, a challenge request can be received at the command server 2310 from an input device 150, control device 160, or the like. As used herein, the input device 150 can include, for example, any of the mobile devices 120, a wearable device, a mobile device 120 not being used for imaging the playing area 110 (e.g. another person's smartphone), a web-interface (e.g. a browser or other computer being used to remotely view the match), or the like. The mobile device 120, which can be listening for commands from the command server 2310 or control device 160, can receive confirmation that the challenge request was received at the command server 2310. The processing server 2310 can receive buffered images from one or more buffers in the mobile devices 120. After the challenge is processed as described herein, the control device 160, input device 150, mobile device 120, wearable device, or the like can display the challenge result based on the buffered images received at the processing server 2310.

The mobile device 120 can also be configured to include a catalog of archived or buffered files. The catalog can include timestamps, filenames, unique identifiers, or the like to allow for efficient referencing when processing at the mobile device 120 or for upload to the processing server 2320.

The video uploading subsystem 2380 can process the command to upload any portion of the stored video or images to the processing server 2310 or other connected computer, for remote processing.

As used herein, a processing server 2310 can be a server or other computer where all, or a portion of, the processing of requests or other image analysis can be handled. The processing server 2310 can be a cloud-based server, a local computer, or the like. If sufficiently powerful, the processing server 2310 can also be the control device 160 or any of the mobile devices 120.

Figure 25:
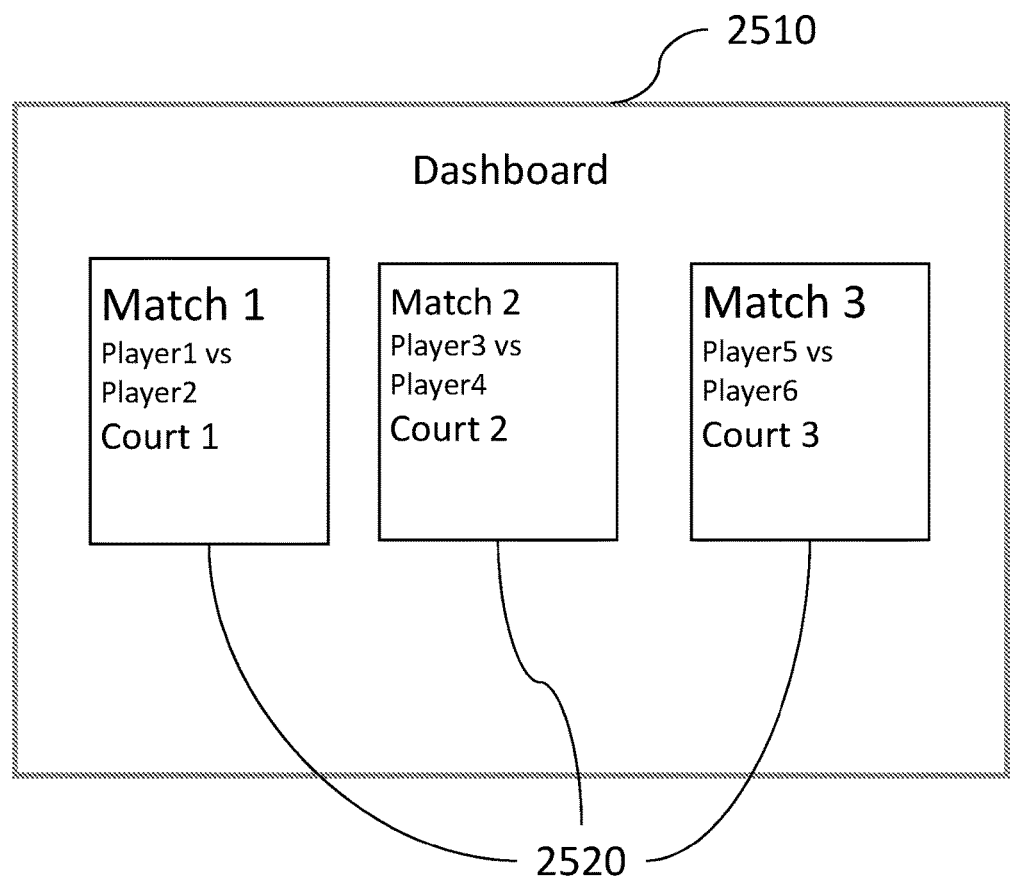
FIG. 25 is a diagram illustrating a simplified dashboard of a graphical user interface for remote umpiring in accordance with certain aspects of the present disclosure.
Figure 26:
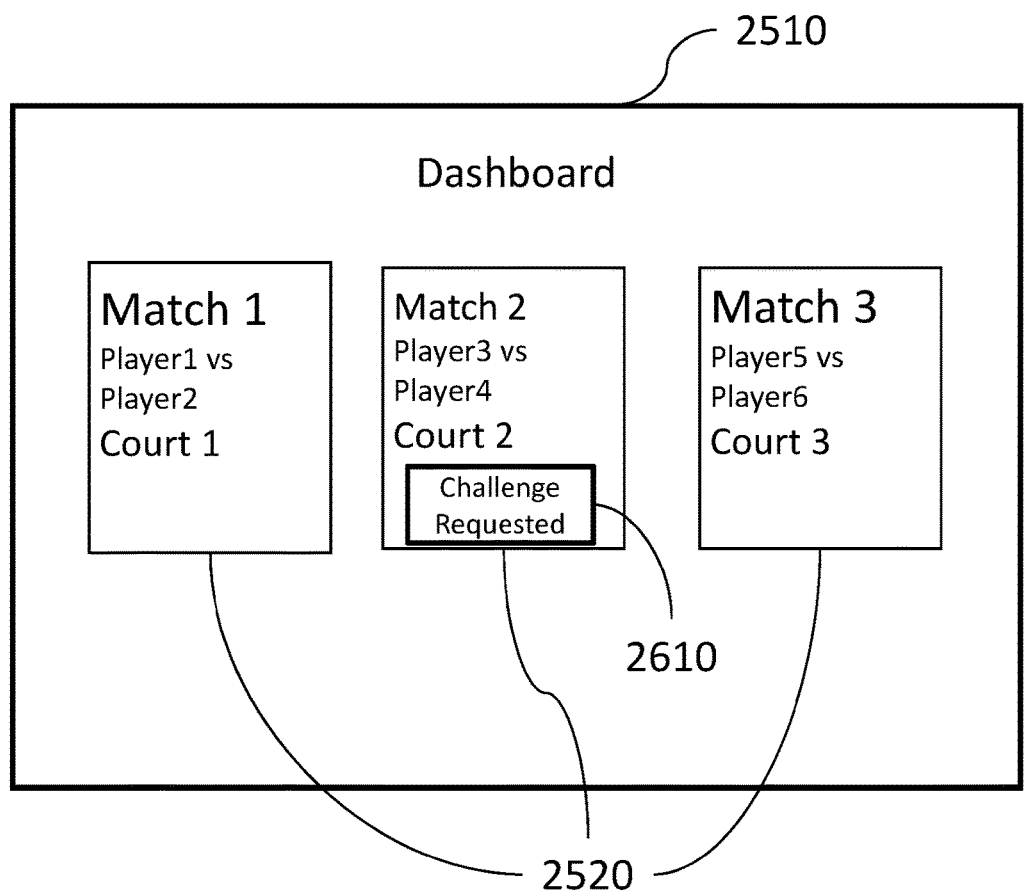
FIG. 26 is a diagram illustrating a simplified indication of a challenge displayed at the dashboard in accordance with certain aspects of the present disclosure.
Figure 27:
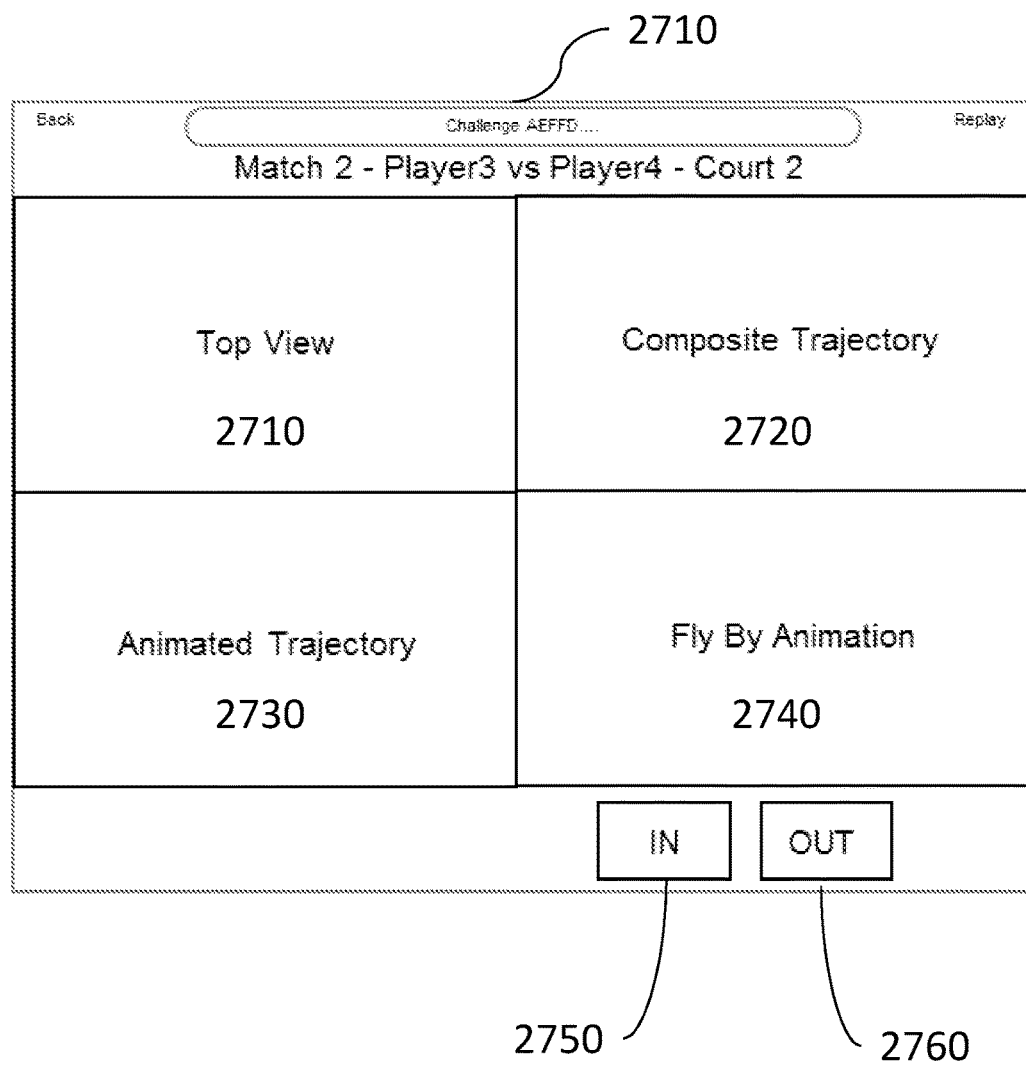
FIG. 27 is a diagram illustrating a simplified review screen of a graphical user interface for remote umpiring in accordance with certain aspects of the present disclosure.

FIG. 25 illustrates a dashboard of a graphical user interface for remote umpiring in accordance with certain aspects of the present disclosure. FIG. 26 illustrates an indication of a challenge displayed at the dashboard in accordance with certain aspects of the present disclosure. FIG. 27 illustrates a review screen of a graphical user interface for remote umpiring in accordance with certain aspects of the present disclosure.

The control device 160 can control, oversee, and manage, any number of matches that are being executed by the system described herein. In the example simplified user interface shown in FIG. 25, there can be any number of buttons 2520 that correspond to matches currently being executed. The buttons 2510 can display a graphical indication of the match number, the players in the match, the court or location of the match, or the like. These graphical indications can also be displayed elsewhere in the user interface. When one of the buttons is selected by user input, the user interface can transition to display information or views relevant to the match.

As shown in FIG. 26, the dashboard 2510 can display a graphical element 2610 that indicates that a challenge has been requested. When the corresponding button 2520 is selected, the review screen 2710 shown in FIG. 27 can be displayed.

The review screen 2710 can include one or more displays that can show the video relevant to the challenge event, for example, the video recalled from the buffer from the mobile devices 120 that are recording the match. The displays can include a top view 2710, composite trajectory 2720, an animated trajectory 2730, and a fly-by animation 2740.

The top view 2710 can show the virtual court including player positions, points of impact, object positions, system-generated lines, other features of the court, or the like. The top view can be similar to that shown in FIG. 7. The composite trajectory 2720 can show the position of the object at several different locations corresponding to different video frames. The composite trajectory 2720 can be similar to that shown in FIG. 13. An animated trajectory 2730 can also be displayed. The animated trajectory 2730 can be similar to the composite trajectory, but include a smooth animation of the object's trajectory, including the bounce point, as opposed to the discrete images acquired at each video frame. The animation can involve interpolating or extrapolating between image frames and can be consistent with the known surface of the playing area to accurately render any bounces of the object. The fly-by animation can display a view of the trajectory that can be modified in response to user input to view the trajectory from an arbitrary angle or apparent distance.

Figure 28:
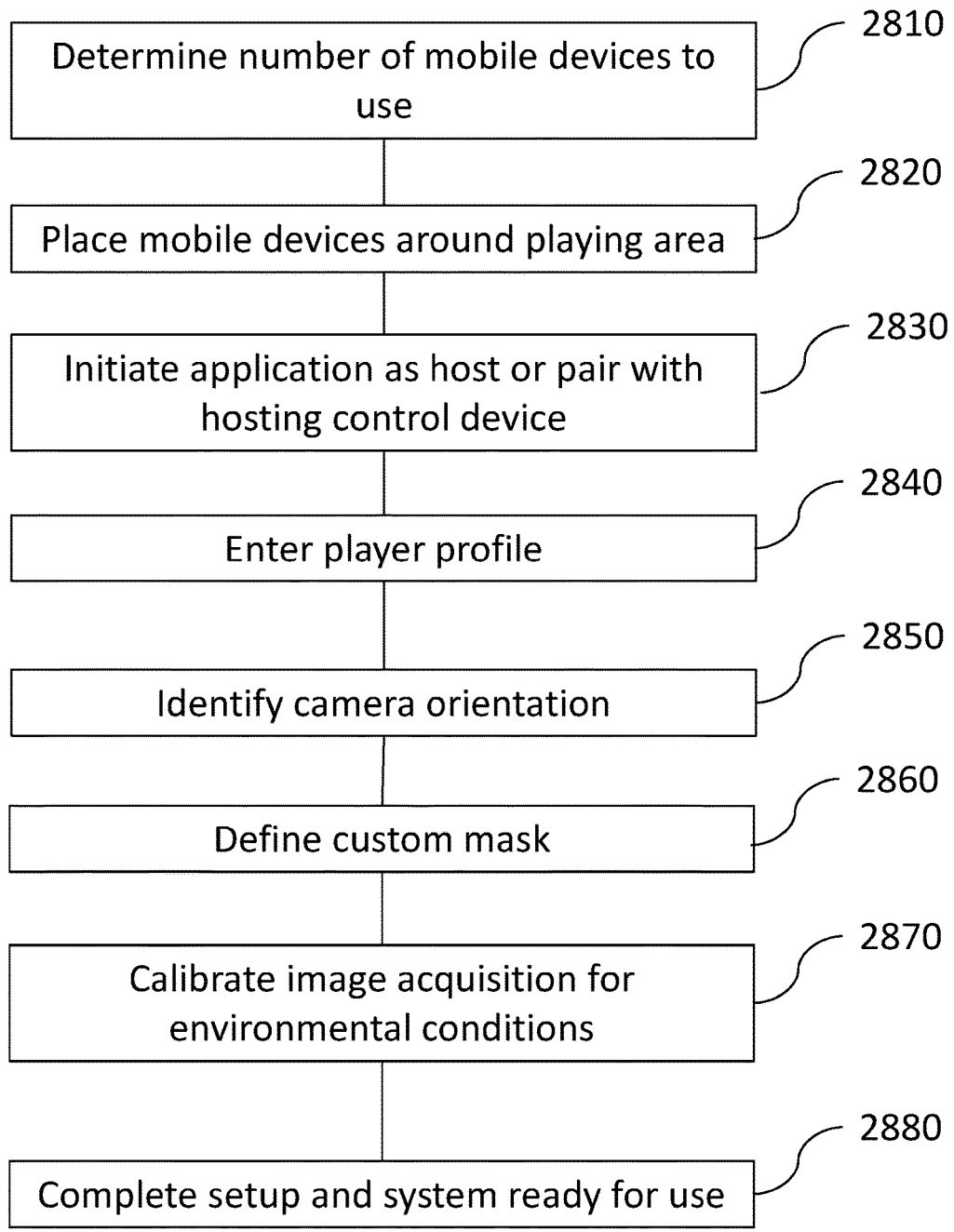
FIG. 28 is a process flow diagram illustrating an initialization method in accordance with certain aspects of the present disclosure.

FIG. 28 illustrates an initialization method in accordance with certain aspects of the present disclosure. In one implementation, the process can begin by the user selecting the number, at 2810, and placement, at 2820, of the mobile devices 120 around the play area. Once the mobile devices 120 are placed, the application can, at 2830, be started as a host, or the mobile devices 120 can be linked to a system already functioning as a host. At 2840, a player profile can be created or selected from previously saved profiles. At 2850, camera orientation, at 2860, image masking, and, at 2870, calibration can occur as described above to prepare the system for use. Once completed, at 2880, the mobile devices 120 can be used to acquire images during the course of play.

Figure 29:
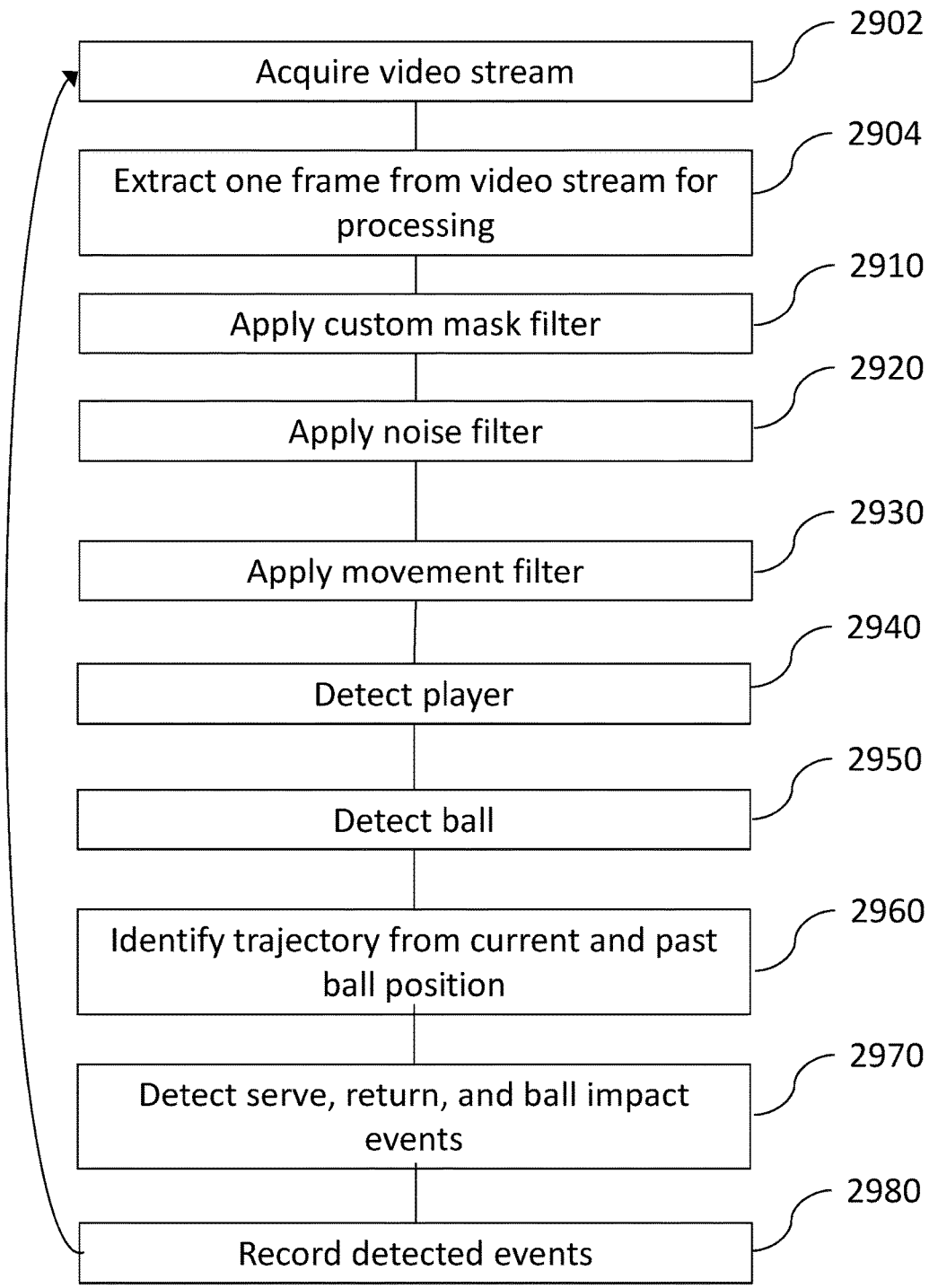
FIG. 29 is a process flow diagram illustrating a first tracking method in accordance with certain aspects of the present disclosure.

FIG. 29 illustrates a first tracking method in accordance with certain aspects of the present disclosure. Once initialized, for example as shown in FIG. 28, the application can begin, at 2902, by processing an acquired video stream by all of the connected mobile devices 120 viewing the play area. At 2904, for each frame acquired, the frames can be synchronized and combined to form a consistent time-sequence of video images of the play area. Then, at 2910 the custom mask filter, at 2920 the noise filter, at 2930 the movement filter, at 2940 the player detector, and at 2950 the ball detector, can be applied to each frame to determine the location of the players and/or the ball. At 2960, the ball's trajectory can be identified based on the received images and the application object tracking algorithms. At 2970, serves, returns, and ball impacts can be determined based on, for example, external user input, input from wearable devices, or the like. At 2980, the determined events can be recorded by the mobile device 120 or any connected computing system. One feature that can be enabled by the functionality described herein is the training of a player and accumulation of statistics related to the recorded events.

Figure 30:
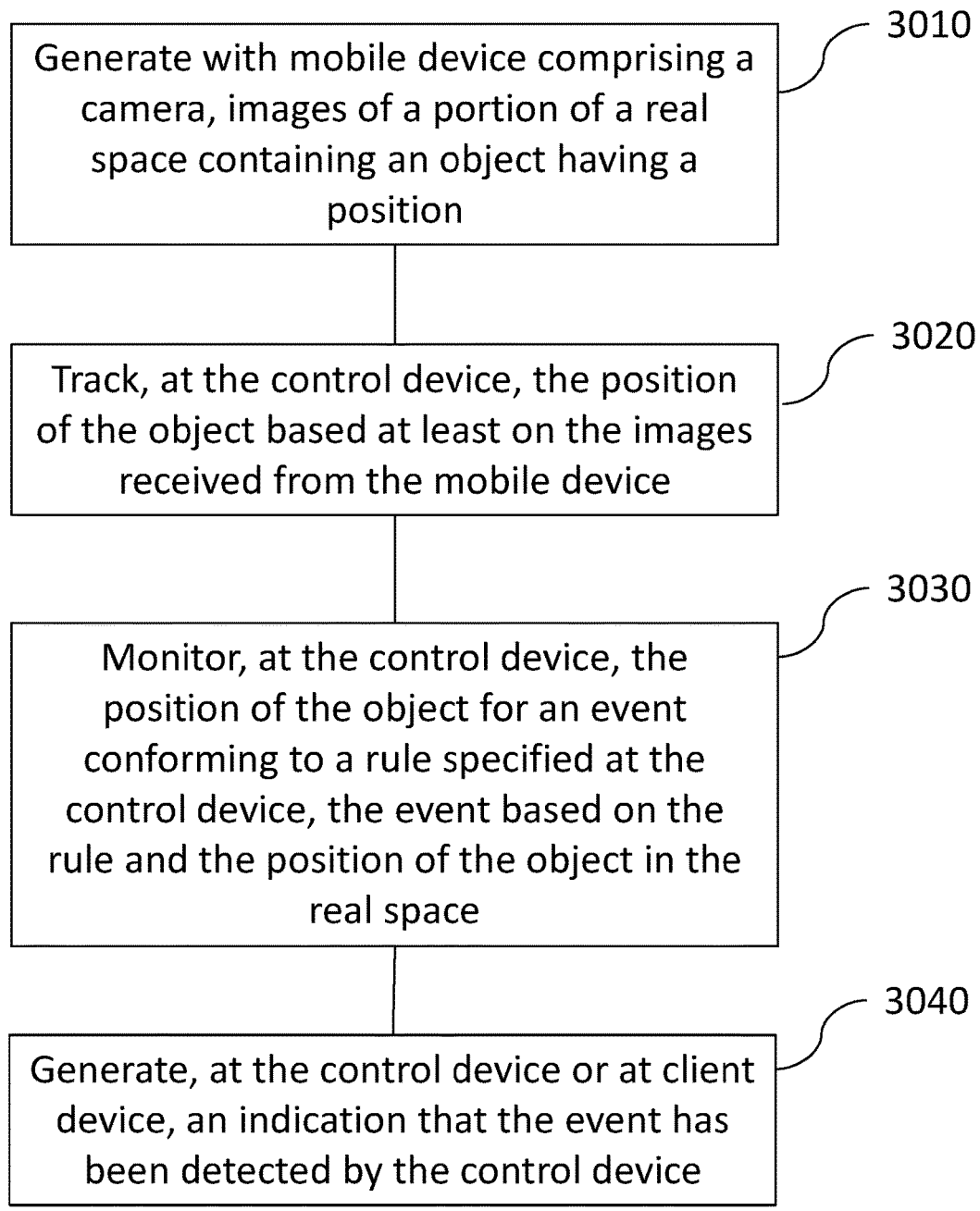
FIG. 30 is a process flow diagram illustrating a second tracking method in accordance with certain aspects of the present disclosure.

FIG. 30 illustrates a second tracking method in accordance with certain aspects of the present disclosure. At 3010, images of a portion of a real space containing an object 170 having a position can be generated with a mobile device 120 having a camera.

At 3020, the position of the object 170 can be tracked at the control device 160 based on at least the images received from the mobile device 120.

At 3030, the position of the object can be monitored for an event conforming to a rule, which can be specified at the control device 160. The event can be based on the rule and the position of the object 170 in the real space.

At 3040, an indication that the event has been detected by the control device 160 can be generated at the control device 160 or at a client device.

Because of the high-level nature and complexity of the selections and methods described herein, including the multiple and varied combinations of different calculations, computations and selections, such selections and methods cannot be done in real time quickly, or at all, by a human. The processes described herein rely on the machines described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that a specifically unmentioned feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   generating, with a mobile device comprising a camera, a plurality of images of a portion of a real space containing an object having a position;
   tracking, at a control device, the position of the object based at least on the plurality of images received from the mobile device;
   monitoring, at the control device, the position of the object for an event conforming to a rule, the event based on the rule and the position of the object in the real space;
   generating, at the control device or at a client device, an indication that the event has been detected by the control device; and
   transmitting, from the mobile device to the control device upon receipt of a transmit command at the mobile device, a buffered plurality of images corresponding to the plurality of images captured during a buffer time prior to receipt of the transmit command.

2. The computer-implemented method of claim 1, the tracking further comprising:
   identifying the object in the plurality of images based at least on a property of the object as it appears in the plurality of images;
   mapping image coordinates of the object in the plurality of images to real coordinates of the object in the real space;
   calculating a trajectory of the object based at least on the real coordinates; and determining an event position of the object based at least on the calculated trajectory, the event position corresponding to the position of the object required to apply the rule for determining the occurrence of the event.

3. The computer-implemented method of claim 2, wherein the object is a ball and the event position is a point of impact of the ball on a surface in the real space.

4. The computer-implemented of claim 2, wherein the object is a ball and the event position is a hit position of the ball when the ball is hit by a player.

5. The computer-implemented of claim 2, wherein the property is a size of the object in at least one of the plurality of images.

6. The computer-implemented method of claim 2, the identifying comprising at least one of:
   applying a custom mask filter to remove a masked portion of the plurality of images to prevent the portion from being processed during the identifying;
   applying a noise filter that removes an outlier real coordinate by comparing the real coordinate to an expected trajectory of the object, the trajectory based at least on remaining real coordinates; and
   applying a movement filter to remove a static portion of the plurality of images, the static portion identified as regions of the plurality of images that are generally unchanging between consecutive images.

7. The computer-implemented method of claim 2, the determination of the event position comprising:
   generating a score for an image from each of the plurality of mobile devices that imaged the event, the score based on factors comprising: an object area of the object, a spread of the trajectory, and a roundness of the object;
   wherein the factors are determined from the image; and
   selecting the image that has the highest score for determining the event position of the object.

8. The computer-implemented method of claim 1, wherein the generating of the plurality of images is performed by a plurality of mobile devices, the plurality of mobile devices having a corresponding camera, and wherein the plurality of mobile devices are paired at the control device, the method further comprising:
   generating a match identification at the control device, the mobile device, or a t a remote computer;
   displaying a graphical identifier corresponding to the match identification;
   scanning, with the camera on the mobile device, the graphical identifier to associate the mobile device with the match identifications;
   listening, at the plurality of mobile devices, for a command from the control device that is associated with the match identification; and
   executing the command at the mobile device, the command comprising transmitting at least one of the plurality of images to the control device.

9. The computer-implemented method of claim 1, further comprising:
   alternating writing the buffered plurality of images to a first buffer and a second buffer, the alternating switching between writing to the first buffer and the second buffer every elapsed buffer time.

10. The computer-implemented method of claim 1, further comprising:
    receiving, at a command server from an input device or the control device, a challenge request;
    receiving, at the mobile device, confirmation that the challenge request was received at the command server;
    receiving, at a processing server from the mobile device, a buffered plurality of images from a buffer in the mobile device; and
    displaying, at the control device, a challenge result based on the processing server processing the challenge request with the buffered plurality of images.

11. The computer-implemented method of claim 1, further comprising:
    initiating a match at the control device; and
    pairing the mobile device to the control device causing the images received from the mobile device to be associated with the match based on a match identifier and a device identifier, where commands transmitted from the control device are executed by the mobile device when the command includes the match identifier and the device identifier.

12. The computer-implemented method of claim 1, further comprising:
    calculating an object speed based on a difference between the real coordinates of the object at times when the corresponding images of the plurality of images were acquired; and
    displaying the object speed at the control device.

13. The computer-implemented method of claim 1, further comprising:
    imaging, with the mobile device, a plurality of reference points in the real space;
    generating, based on the plurality of reference points and a playing area configuration, system-generated lines displayed at the control device, the system-generated lines approximating court lines imaged by the mobile device and displayed proximate to the court lines simultaneously displayed at the control device; and
    adjusting the system-generated lines to be substantially overlapped with the court lines to cause the position of the object in the real space to conform to a corresponding position of the object in a virtual space defined by the system-generated lines, wherein the adjusting is in response to user-generated input at the control device.

14. The computer-implemented method of claim 1, further comprising:
    calibrating a white balance of the plurality of images to maintain a predefined brightness of at least a portion of the images in the plurality of images.

15. The computer-implemented method of claim 14, wherein the calibrating is dynamically performed in response to a detected change in lighting conditions in the real space.

16. The computer-implemented method of claim 1, further comprising:
    generating, at a graphical user interface, a textual representation of statistics corresponding to the tracked motion of the object and the rule, wherein the event is a bounce of an object and the rule designates whether the object is in a defined region of the real space or out of the defined region of the real space.

17. The computer-implemented method of claim 1, further comprising:
    automatically updating a score displayed on a user interface in response to detecting the event, wherein the event is a scoring event according to the rule.

18. A computer program product comprising a non-transient, machine-readable medium storing instructions which, when executed by at least one programmable processor, cause the at least one programmable processor to perform operations comprising:

generating, with a mobile device comprising a camera, a plurality of images of a portion of a real space containing an object having a position;

tracking, at a control device, the position of the object based at least on the plurality of images received from the mobile device;

monitoring, at the control device, the position of the object for an event conforming to a rule, the event based on the rule and the position of the object in the real space;

generating, at the control device or at a client device, an indication that the event has been detected by the control device; and transmitting, from the mobile device to the control device upon receipt of a transmit command at the mobile device, a buffered plurality of images corresponding to the plurality of images captured during a buffer time prior to receipt of the transmit command.

19. A system comprising:

at least one programmable processor; and a non-transient machine-readable medium storing instructions which, when executed by the at least one programmable processor, cause the at least one programmable processor to perform operations comprising:

generating, with a mobile device comprising a camera, a plurality of images of a portion of a real space containing an object having a position;

tracking, at a control device, the position of the object based at least on the plurality of images received from the mobile device;

monitoring, at the control device, the position of the object for an event conforming to a rule specified at the control device, the event based on the rule and the position of the object in the real space;

generating, at the control device or at a client device, an indication that the event has been detected by the control device; and transmitting, from the mobile device to the control device upon receipt of a transmit command at the mobile device, a buffered plurality of images corresponding to the plurality of images captured during a buffer time prior to receipt of the transmit command.

* * * * *